United States Patent [19]

Skerlos et al.

[11] 4,456,925

[45] Jun. 26, 1984

[54] TELEVISION/TELEPHONE SYSTEM WITH AUTOMATIC DIALING

[75] Inventors: Peter C. Skerlos, Arlington Heights; Thomas J. Zato, Palatine; Frank C. Templin, Arlington Heights, all of Ill.

[73] Assignee: Zenith Radio Corporation, Glenview, Ill.

[21] Appl. No.: 432,464

[22] Filed: Oct. 4, 1982

[51] Int. Cl.³ .................... H04M 11/08; H04N 5/00
[52] U.S. Cl. .............................. 358/85; 179/2 TV; 358/192.1; 358/194.1; 364/514; 455/344
[58] Field of Search ................ 358/85, 192.1, 194.1; 179/2 TV; 364/514; 455/603, 344

[56] References Cited

U.S. PATENT DOCUMENTS

| | | | |
|---|---|---|---|
| 4,232,200 | 11/1980 | Hestad et al. | 179/90 K |
| 4,243,845 | 1/1981 | Feinberg et al. | 179/90 B |
| 4,266,102 | 5/1981 | Stanley et al. | 179/90 CS |
| 4,298,775 | 11/1981 | Buck et al. | 179/81 R |
| 4,338,492 | 7/1982 | Snopko | 358/85 |
| 4,349,701 | 9/1982 | Snopko | 358/85 |
| 4,356,509 | 10/1982 | Skerlos | 358/85 |
| 4,419,662 | 12/1983 | Puskas | 340/750 |

OTHER PUBLICATIONS

Introduction to the 4-Bit one-Chip Microcomputers, pp. 254-257 and p. 245.
Specification sheet for MN 1208, MN 1218 256-bit PROM.

*Primary Examiner*—Howard W. Britton

[57] ABSTRACT

A television receiver incorporating telephone interface circuitry permitting the viewer to remotely place outgoing calls by recalling a selected number from memory is disclosed. An infrared link is used for remotely answering incoming calls, initiating outgoing calls and programming a nonvolatile memory with a plurality of preferred telephone numbers for future use. The nonvolatile memory circuit is accessed by means of a microcomputer in response to user-initiated, remotely generated commands. The television receiver's display performs a user interactive function in displaying television/telephone mode operation information, the contents of user-accessed locations in the nonvolatile memory and the telephone number being stored in memory during the programming mode of operation. The microcomputer controls not only the telephone mode of operation of the system, but also television operation in generating digital tune words in response to a channel number entry and providing these tune words to an indirect frequency synthesis type of television receiver tuner. The contents of the nonvolatile memory may be updated, or changed, as desired by user selection of appropriate controls followed by entry of the new telephone number which is presented on the video display as it is entered for user verification. The video display is then cleared upon return to the television mode of operation or upon television receiver turn-off.

18 Claims, 11 Drawing Figures

TELEVISION/TELEPHONE SYSTEM WITH AUTOMATIC DIALING

CROSS-REFERENCE TO RELATED APPLICATIONS

This application is related to the following applications which are assigned to the assignee of the present application: Ser. No. 109,424, filed Jan. 2, 1980, entitled "Television Receiver With Two-Way Telephone Conversation Capability", in the name of Paul Snopko, now U.S. Pat. No. 4,338,492; Ser. No. 175,456, filed Aug. 5, 1980, entitled "Television Receiver With Two-Way Telephone Conversation and Dial-Out Capabilities", in the name of Paul Snopko, now U.S. Pat. No. 4,349,701; Ser. No. 260,639, filed May 4, 1981, entitled "Character Generator with Latched Outputs" in the names of Jeffery Puskas, Peter C. Skerlos and Thomas J. Zato, now U.S. Pat. No. 4,419,662; and Ser. No. 243,010, filed Mar. 12, 1981, entitled "Microcomputer-Controlled Television/Telephone System and Method Therefor", in the names of Peter C. Skerlos, et al, now U.S. Pat. No. 4,356,509.

BACKGROUND OF THE INVENTION

This invention relates generally to a system and method for communicating by telephone using a conventional television receiver, and more particularly relates to a system and method for remotely initiating the automatic dialing of a predetermined number in placing a telephone call by means of a conventional television receiver.

The conventional telephone has been integrated, sometimes out of convenience and sometimes out of necessity, with various other systems to provide a more versatile communications device. For example, the telephone has been integrated with a highly sensitive microphone in combination with a loudspeaker. The high sensitivity microphone is capable of picking up audio signals in the vicinity of the telephone while the loudspeaker amplifies the incoming audio signals to permit remote audio communications via the telephone. These systems are generally referred to as "speaker" telephone systems.

The conventional telephone has also been integrated with a video display to form a video telephone capable of transmitting audio and video information between parties. These systems add considerable complexity to the conventional telephone link in that they require two high quality, wide band video transmission networks including two dedicated video cameras. The additional complexity and expense inherent in these systems has severely limited their widespread adoption and acceptance.

U.S. patent application Ser. No. 243,010, filed Mar. 12, 1981, referred to above, discloses a television receiver incorporating telephone interface circuitry permitting the viewer to not only answer incoming calls but also place outgoing calls by means of the television receiver's remote control system. A tuner-integrated microcomputer is used to drive a character generator in presenting the telephone number dialed on the television receiver's video display and to provide the touch tone dialed telephone number to a standard telephone line. A limited automatic re-dial feature is provided in that the last phone number dialed is temporarily stored in the microcomputer's memory and recalled therefrom by means of a single button selection for re-dialing the immediately preceding dialed number which was busy or went unanswered.

The desirability of providing rapid access to a plurality of called locations at the other end of the telephone line is, of course, obvious. This feature not only makes telephone usage more convenient, but also may become a necessity in times of stress such as in placing an emergency call to a physician, the police department or the fire department. In addition, a speed call capability is highly desirable for facilitating telephone usage by the handicapped. Finally, this type of feature would also be very useful in initiating calls to a frequently used number, such as that of a business, relative, or friend. Such systems ideally should permit the user to initiate the automatic dialing of a selected number by means of a simple and reliable procedure. The user should also be able to easily program or store such numbers simply and economically with a minimum of difficulty.

U.S. Pat. No. 4,283,845 to Feinberg et al., discloses a repertory dialer having first and second control means for respectively storing in a memory a plurality of digits indicative of a telephone number and for selectively recalling these digits from memory and providing them to a conventional telephone line. The single key operation in recalling a desired telephone number from memory provides a speed dialing capability in the system. U.S. Pat. No. 4,232,200 to Hestad et al., discloses a telephone repertory dial system including a signal processor and memory which obtains power under normal conditions from the telephone line or from batteries when the telephone is unplugged from the line. Isolation circuitry is included in the system for avoiding the loss from the volatile memory of the telephone numbers stored therein and power is provided to the unit in both the "on-hook" and "off-hook" conditions. U.S. Pat. No. 4,266,102 to Stanley et al., discloses an automatic telephone dialing system capable of reading a telephone number encoded on a business card or a credit card, storing the number in memory, and generating telephone output dialing pulses in accordance with the stored memory contents. In addition, a keyboard is also provided together with an associated memory, permitting two telephone numbers, one entered into the device via an encoded card and the other entered into the device via the keyboard, to be stored within the unit.

U.S. Pat. No. 4,298,775 to Buck et al., relates to a telephone set for use in a telephone network with a switch gear connected to incoming telephone lines and to a plurality of individual telephone stations to establish communication between selected stations and/or incoming telephone lines. The switch gear includes a memory and the capability of receiving command signals from the telephone set, transmitting confirmation signals to a set, and performing selected functions in response to the command signals. A programmable microprocessor is included for automatically scanning the switches, detecting an actuated switch and generating a command signal corresponding to the selected function.

Although the above discussed telephone dialing systems facilitate user dialing of selected telephone numbers, these systems suffer from various limitations. For example, none offers a memory capable of retaining its contents when disconnected from the power source without the assistance of batteries. Also, none of the above discussed systems provides the user with information regarding the contents of each memory location.

This information could be provided by means of a list located on or adjacent to the telephone unit, but such lists may become displaced or require frequent change as the memory is updated to accommodate new frequently dialed numbers.

OBJECTS OF THE INVENTION

Accordingly, it is an object of the present invention to provide an improved means and method for integrating a telephone in a television receiver.

It is another object of the present invention to provide a novel means and method for rapidly and automatically dialing a selected telephone number by means of the remote control system of a conventional television receiver.

Still another object of the present invention is to provide an improved telephone/television system with automatic dialing and stored telephone number re-programming capabilities.

A further object of the present invention is to provide an improved means and method for controlling an integrated television receiver-telephone system in which preferred telephone numbers may be automatically dialed in response to user inputs with the dialed number presented on the television receiver's video display.

A still further object of the present invention is to provide an improved means and method for storing in and recalling from a nonvolatile memory a plurality of predetermined telephone numbers under the control of a microcomputer and presenting the thus stored and recalled telephone numbers on a video display prior to transmitting a selected telephone number to a telephone line in initiating telephone communication.

BRIEF DESCRIPTION OF THE DRAWINGS

The appended claims set forth those novel features believed characteristic of the invention. However, the invention itself as well as further objects and advantages thereof will be best be understood by reference to the following detailed description of a preferred embodiment taken in conjunction with the accompanying drawings, where like reference characters identify like elements throughout the various figures, in which:

DESCRIPTION OF THE PREFERRED EMBODIMENTS

Figure 1:
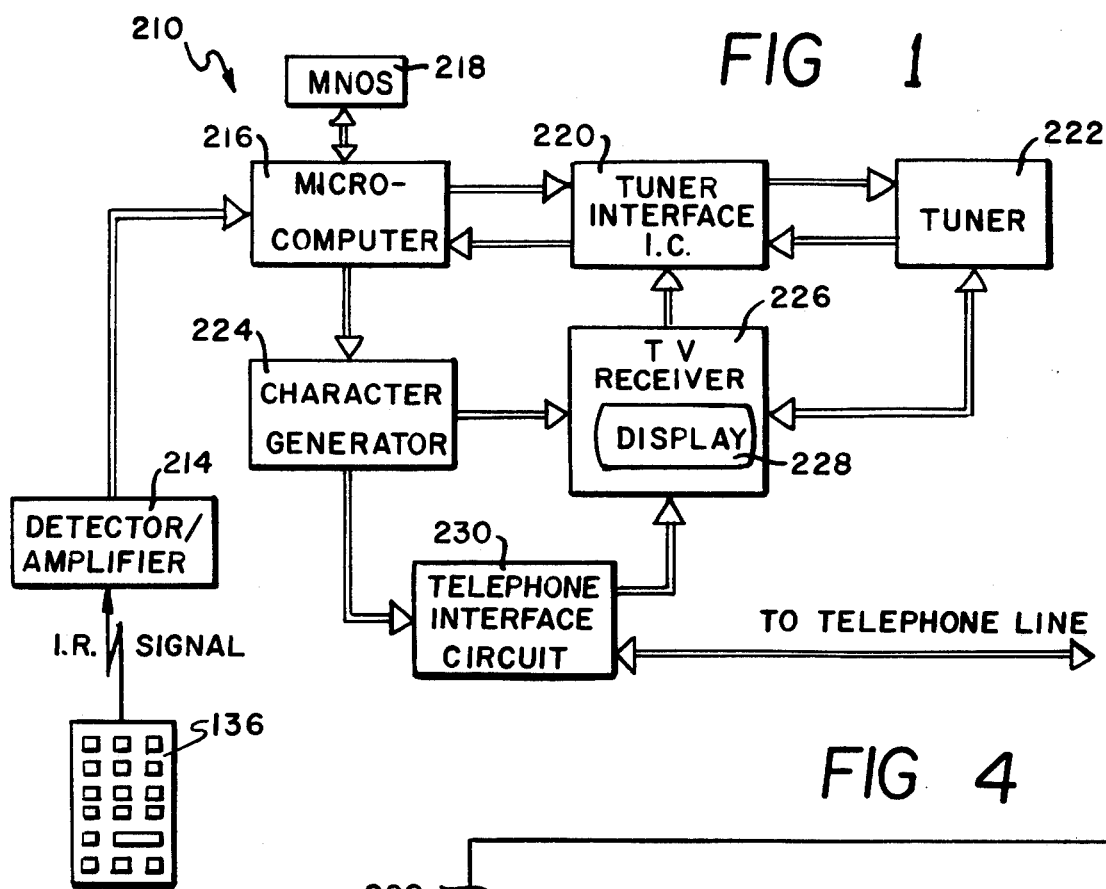
FIG. 1 is a simplified block diagram of a television/telephone system with automatic dialing in accordance with the present invention.

Referring to FIG. 1, there is shown a simplified block diagram of a television/telephone system with automatic dialing 210 in accordance with the present invention. The system includes a remote signal detector/amplifier 214 responsive to remotely generated control signals from a remote control transmitting unit 136 under user control. The remote signals are preferably propagated in the infrared (IR) spectrum and contain the control information in the form of pulse code modulated variations in the propagated signals. The remote signal detector/amplifier 214 receives, amplifiers and provides a squared output control signal from the remote control transmitter 136 to a microcomputer 216. The squared output signal consists of pulses which contain serial data bits which are then decoded by microcomputer 216. The decoding process is accomplished by means of stored hardware logic within microcomputer 216 and is controlled by the microcomputer software program contained in its ROM (Read Only Memory). Microcomputer 216 provides appropriate outputs during the channel selection and tuning process to the television receiver's tuner circuitry 222 via an interface circuit 220. During automatic dialing, the microcomputer 216 provides appropriate outputs to a telephone line via a telephone interface circuit 230. Appropriately decoded outputs are also provided by microcomputer 216 to a nonvolatile MNOS memory 218 for future programming of the television receiver, e.g., favored channel tuning and automatic telephone number dialing.

Microcomputer also 216 provides appropriate digital outputs to a character generator 224 which is coupled to the remainder of the television receiver 226 which includes a video display 228. The character generator 224 provides the appropriate digital signals to the video display 228 for the presentation thereon of a dialed or programmed telephone number, as described below in greater detail. Similarly, the microcomputer 216 provides appropriate dialing signals to the telephone interface circuit 230 which, in turn, provides signals representing the dialed number to a conventional telephone line. Incoming signals from the telephone line are also provided via telephone interface circuit 230 to the remainder of the television receiver 226, i.e., the television receiver's audio system, for generating audio signals by the speaker system of the television receiver. Various information is provided from the various systems in the television receiver 226 via the television tuner interface circuit 220 to the microcomputer 216 for optimum television receiver performance. This feedback information may include such things as synchronization signal information, automatic frequency control (AFC) information, etc. The tuner primarily provides intermediate frequency (IF) signal information to the remaining portions of the television receiver 226. The television/telephone system shown in FIG. 1 is capable of operating either in a television mode of operation or a telephone mode of operation as selected by a viewer/user. In addition, in the telephone mode of operation the present invention is capable of operating either in an incoming call receive mode, an outgoing call transmit mode, or an automatic dial mode including the programming of a selected telephone number in a memory unit and the recalling therefrom of that telephone number as desired. The television and incoming telephone call receipt modes of operation are described in the above-reference patent application entitled "Microcomputer-Controlled Television/Telephone System and Method Therefor" the disclosure of which is hereby incorporated by reference in the present application. The present invention relates to the automatic dial mode of operation of the television/telephone system shown in FIG. 1 and it is this feature which is described in detail in the following paragraphs.

Figure 2:
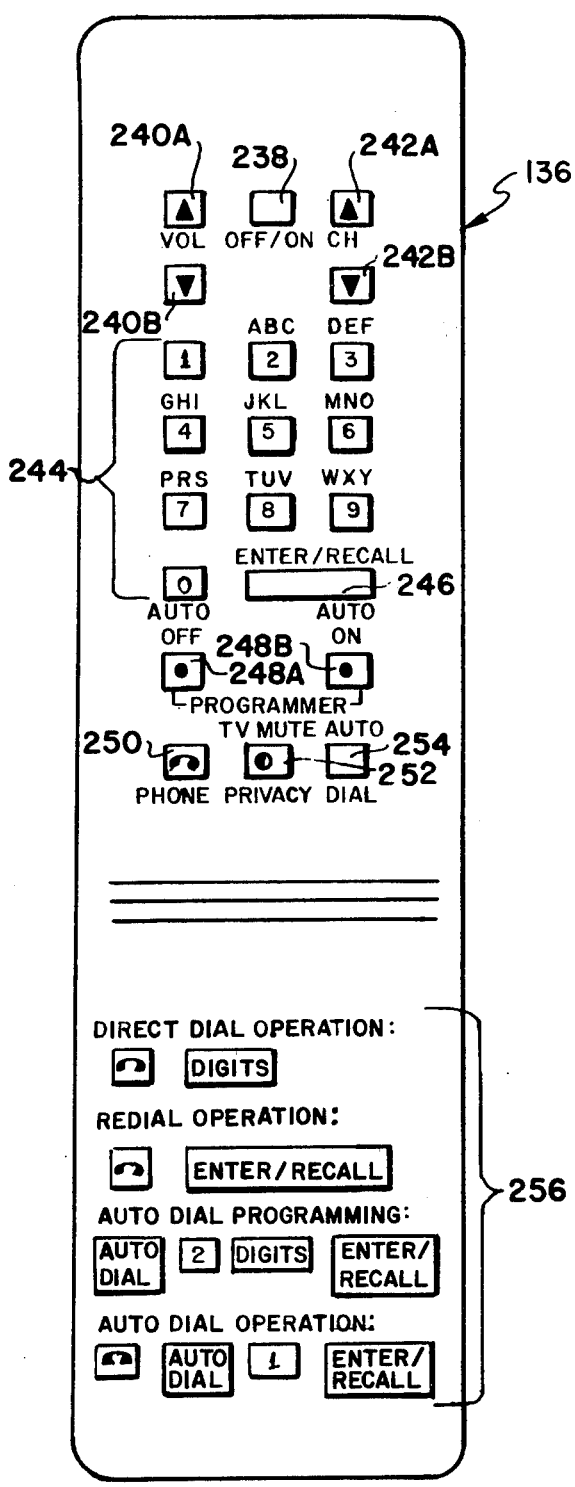
FIG. 2 shows a remote control panel for use in the television/telephone system with automatic dialing illustrated in FIG. 1.

Referring to FIG. 2, there is shown a remote controller 136 for generating the control signals utilized in the present invention. The remote control transmitter 136 shown in FIG. 2 is of conventional electronics design and includes, generally, IR emitting diodes, an integrated circuit, a transistor, an oscillator adjustment potentiometer, a matrix keyboard, and a low voltage DC potential source. The electronic configuration and operation of the remote control unit 136 will not be further discussed as it does not form a part of the present invention, however, the various control signals generated by this remote control transmitting unit are described in the following paragraphs.

A sixty-four level volume control includes volume up and volume down controls 240A, 240B. These controls are used to regulate the volume of the television receiver in the television mode of operation and the telephone output to the television receiver's speaker in the telephone mode of operation to the desired level. OFF-/ON control 238 provides OFF and ON control of the television receiver in the television mode of operation while a channel selector including channel up and channel down controls 242A, 242B permits programmed channel scanning selection during the television mode of operation. Direct access selection is accomplished by means of desired channel number selection on the alpha-numeric keyboard arrangement 244 followed by selection of the ENTER/RECALL control 246 within a predetermined time period following channel number entry. Receipt of an incoming telephone call is initiated by engagement of the telephone mode selector 250 which permits the television receiver to operate as a speaker phone with a microphone 31 in the television receiver responsive to audio inputs and the television receiver's speaker providing audio outputs to the viewer/user of the television/telephone system of the present invention. An AUTO OFF control 248A and an AUTO ON control 248B are utilized in the automatic programming of the television receiver to initiate automatic turn on or turn off at a predetermined time in accordance with information stored in a random access memory (RAM) described below. A TV MUTE/PRIVACY control 252 permits the audio output of the television receiver to be muted when in the television mode of operation and the microphone on the television receiver to be disabled in order to temporarily terminate outgoing audio communication when in the telephone mode of operation. Again, these features and the operation of such a system are described in the aforementioned patent application entitled "Microcomputer-Controlled Television/Telephone System and Method Therefor".

Shown on the lower portion of the remote controller 136 of FIG. 2 are a series of instructions 256 in pictorial form representing several series of sequential operations required for operating the television/telephone system of the present invention in the various telephone modes available. For example, in the direct dial operation the TELEPHONE MODE selector 250 is first selected, followed by entry of the digits of the desired telephone number on keyboard 244. Next is shown the re-dial operation procedure involving the initial selection of the TELEPHONE MODE selector 250 followed by selection of the ENTER/RECALL key 246 within a predetermined period thereafter. Next is shown the automatic dial programming sequence while in the television mode of operation wherein a desired number is stored in memory for later recall. This sequence involves first selecting the automatic dial selector 254, followed by selection of a digit, or digits, representing the location in memory where the desired number is to be stored. In the embodiment of the present invention described herein, two memory locations for storing telephone numbers are available and hence the digits 1 or 2 representing these locations may be entered at this time. The present invention is certainly not limited to the storage of merely two desired telephone numbers, as this is a function only of the size, or capacity, of the programmable memory. Following the designation of the memory location in which the desired number is to be stored, the digits of the desired telephone number are then entered via keyboard 244, followed by selectin of the ENTER/RECALL key 246. Next is shown the sequence of the automatic dial-out operation involving the initial selection of the TELEPHONE MODE selector 250 followed by the selection of the automatic dial selector 254. The memory location from which the desired number is to be removed is then entered by means of keyboard 244, followed by selection of the ENTER/RECALL key 246 which initiates the transmission of appropriate signals from the television/telephone system 210 to the telephone line for initiating and completing the telephone call. This sequence of operations permits the user to alternately select and view the telephone number to be dialed prior to the activation of the ENTER/RECALL key 246.

Figure 3:
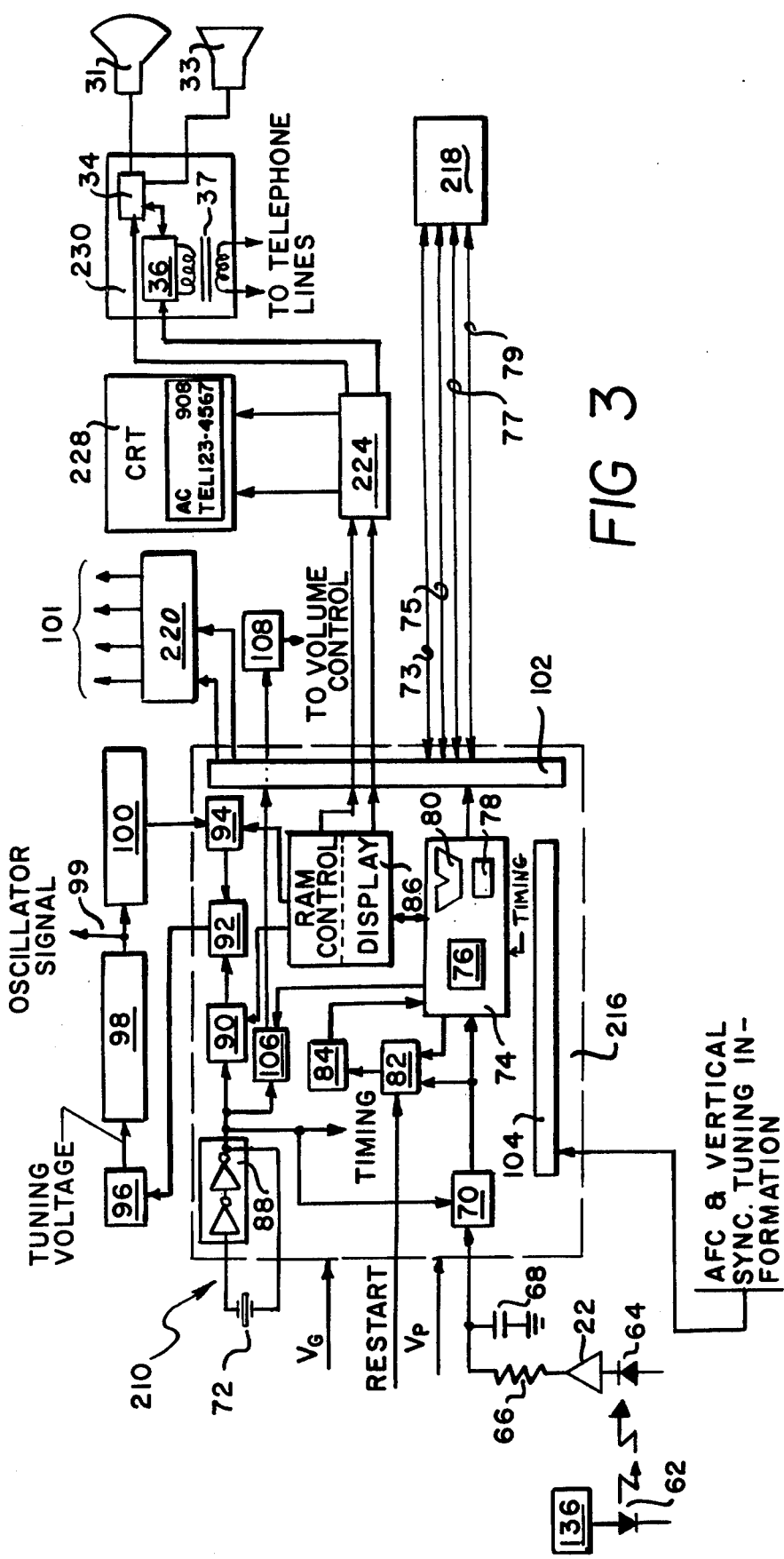
FIG. 3 is a combination block diagram and schematic diagram showing the television/telephone system of FIG. 1 in greater detail.

Referring to FIG. 3, there is shown partially in block diagram form and partially in schematic diagram form a television/telephone system 210 in accordance with a preferred embodiment of the present invention. A remote control transmitting unit 136 provides a pulse code modulated command signal to infrared (IR) emitting diodes 62. In the preferred embodiment of the present invention, three IR emitting diodes are utilized to provide large amplitude signals having unique pulse code modulation formats. The coded IR signals thus produced are transmitted to and received by a photosensitive diode 64 connected to a conventional IR signal detector/amplifier 22. The squared output signal consists of the pulses which contain the serial data bits. These pulses are then transferred through a connector (not shown) to an RC noise filter comprised of a resistor 66 and a grounded capacitor 68 and then to microcomputer 216 for decoding. The decoding process is implemented by special hardware logic in microcomputer 216 and is controlled by the microcomputer software program contained in its ROM (Read Only Memory) 84.

Microcomputer 216 is a four bit, E/D MOS integrated circuit with a ROM 84, a RAM 86, a central processing unit (CPU) 74, an input counter 70, a program counter 82, and various other circuitry (not shown) typically incorporated in the conventional microcomputer. The microcomputer 216 stores instructions and data, periodically updates the stored data, compares both stored and real-time data and makes decisions based upon these comparisons by means of logic instructions in providing system control. The ROM 84 is a mask-generated, nonvolatile, 4,096×8 bit memory matrix which includes 4,096 memory locations or "bytes" of 8 bits each. Program instructions and data are stored in ROM 84 which has a seventy-nine instruction capacity. 8-bit binary patterns are used by ROM 84 from which instructions and data are sequentially removed under the control of the program counter 82 in reading out each instruction to be executed for carrying out program functions. RAM 86 has an X-register, Y-register, memory matrix organization for temporary memory storage of 256 words of 4 bits each. Each bit may be used as a flag to indicate whether a particular event has occurred or the individual flags can be used in combination in the form of a counter. When instructed, the contents of a directly addressed location in RAM 86 are transferred to accumulator 78 and the reverse process may also be accomplished by means of the proper instruction from ROM 84. RAM 86 organization may be broken up into a lower RAM map and an upper RAM map. The lower RAM map which is shown in Table I provides control of television receiver tuning, video display presentation and other functions related to television receiver operation. The upper RAM map which is shown in Table II is primarily involved with the automatic dial-out operation, the display of a dialed telephone number, and the timing involved in the AUTO-ON and AUTO-OFF operation of the television receiver which does not form a part of the present invention.

RAM memory locations are designated by M(X,Y) terminology with words expressed generally in hexadecimal code. For example, the received channel designation is located in the M(0,7) location (units) and the M(0,6) location (tens) of the lower RAM map as shown in Table I. Similarly, referring to Table II, the memory locations in the upper RAM map for the storage in and recall from first and second telephone numbers for automatic dialing are from the M(10,0) location to the M(10,12) location for the first telephone number and from the M(11,0) location to the M(11,12) location for the second telephone number stored in RAM 86.

TABLE I

| X | Y | 15 | 14 | 13 | 12 | 11 | 10 | 9 | 8 | 7 | 6 | 5 | 4 | 3 | 2 | 1 | 0 | Y | X |
|---|---|----|----|----|----|----|----|---|---|---|---|---|---|---|---|---|---|---|---|
| 7 | 1<br>2<br>4<br>8 | Rmt Timing | Rmt Low Counter 2 | Rmt Low Counter 1 | Rmt Erase Counter | Rmt Flag Counter | Rmt Pulse Seq. | < REMOTE ><br>Current Code<br>LSD    2 | | MSD | | TEMP<br>STORAGE POWER | | | < Key In Data ><br>MSD   LSD | | On Set Key | Every 20 µs | 1<br>2<br>4<br>8 | 7 |
| 6 | 1<br>2<br>4<br>8 | — | CRT | AUTO DIAL NO. | ADDRESS CALCULATION BUFFER | | X-Adr | Y0Adr | TEL WRT Flag | | | < PREFERRED CH MNOS WRITE FLAG > | | | | | | 1<br>2<br>4<br>8 | 6 |
| 5 | 1<br>2<br>4<br>8 | 54<br>55<br>56<br>57 | 50<br>51<br>52<br>53 | 46<br>47<br>48<br>49 | 42<br>43<br>44<br>45 | 38<br>39<br>40<br>41 | 34<br>35<br>36<br>37 | 30<br>31<br>32<br>33 | 26<br>27<br>28<br>29 | 22<br>23<br>24<br>25 | 18<br>19<br>20<br>21 | 14<br>15<br>16<br>17 | 80<br>81<br>82<br>83 | 76<br>77<br>78<br>79 | 72<br>73<br>74<br>75 | 68<br>69<br>70<br>71 | 64<br>65<br>66<br>67 | 1<br>2<br>4<br>8 | 5 |
| 4 | 1<br>2<br>4<br>8 | 60<br>61<br>62<br>63 | 56<br>57<br>58<br>59 | 51<br>53<br>54<br>55 | 48<br>49<br>50<br>51 | 44<br>45<br>46<br>47 | 40<br>41<br>42<br>43 | 36<br>37<br>38<br>39 | 32<br>33<br>34<br>35 | 28<br>29<br>30<br>31 | 24<br>25<br>26<br>27 | 20<br>21<br>22<br>23 | 16<br>17<br>18<br>19 | 12<br>13<br>14<br>15 | 8<br>9<br>10<br>11 | 4<br>5<br>6<br>7 | 0<br>1<br>2<br>3 | 1<br>2<br>4<br>8 | 4 |
| 3 | 1<br>2<br>4<br>8 | PLL Sel (2nd) | KEY JOB FLAG | DISP MODE | SD/P TEL SKIP | BIT | KEY MUT CH. CHANGE KEY ON | < VOLUME ><br>10's    1's | | PO DISP. COUNTER | TEN RASTER KEY COUNTER | | 45 s<br>30 s | 2255 · 125 µs | 250 · 625 µs | 50-125 µs | KEY ON Counter | 1<br>2<br>4<br>8 | 3 |
| 2 | 1<br>2<br>4<br>8 | PLL SEL (LSD) | INIT I.D. or D. FLAG | RECALL FLASH FLAG | TEL DIAL DIGIT COUNT | TEL I.D. or D. TIMER | TEL PULSE COUNT | CLK. INT<br>CLK. STRB | 1/5, ¼ | < NOW TIME ><br>.1 s | 1 s | 10 s | SW 50/60 Select | JOB PR Scan PR CAK 1 Sec | ROOT Flag | — —<br>— — | Tel Input Digit Count | 1<br>2<br>4<br>8 | 2 |
| 1 | 1<br>2<br>4<br>8 | PLL REF (2ND) | PLL REF MAX | PLL REF MIN | MNOS E/W Flag | MNOS E/W Count | ON MUT OFF MUT RDY MUT | — —<br>— —<br>— — | Disc 1 Input | HI Count | LO Count | AFC OK Flag | AFC Step Count | AFC Timer Count | AFC Timer Flag | AFC Timer 2 | AFC Timer 1 | 1<br>2<br>4<br>8 | 1 |
| 0 | 1<br>2<br>4<br>8 | PLL REF (LSD) | TEMP | A ON BURST MOM. | TEMP | A OFF BURST MOM. | SW Bounce | SW Buffer | — —<br>— —<br>— — | RCV | CH | DISP | CH | < TEMP > | | UHF Super Mid Hi VHF | CH/CLK MOD PWC/CATY AF/PLL | 1<br>2<br>4<br>8 | 0 |
| X | Y | 15 | 14 | 13 | 12 | 11 | 10 | 9 | 8 | 7 | 6 | 5 | 4 | 3 | 2 | 1 | 0 | Y | X |

TABLE II

| X | Y | 15 | 14 | 13 | 12 | 11 | 10 | 9 | 8 | 7 | 6 | 5 | 4 | 3 | 2 | 1 | 0 | Y | X |
|---|---|---|---|---|---|---|---|---|---|---|---|---|---|---|---|---|---|---|---|
| 15 | 1 |   |   |   |   |   |   |   |   |   | 15 Sec TEL AOFF FLAG | 15.3 s TEL AOFF TIMER | 5.1 s TEL AOFF TIMER | .32 TEL AOFF TIMER | 5.2 s TEL REDIAL FLAG | 5.1 s TEL REDIAL TIMER | .32 TEL REDIAL TIMER | 1 | 15 |
| 15 | 2 |   |   |   |   |   |   |   |   |   |   |   |   |   |   |   |   | 2 | 15 |
| 15 | 3 |   |   |   |   |   |   |   |   |   |   |   |   |   |   |   |   | 3 | 15 |
| 15 | 8 |   |   |   |   |   |   |   |   |   |   |   |   |   |   |   |   | 8 | 15 |
| 14 | 1 |   |   |   | < A ON + 1 > PM/AM |   |   |   |   |   |   |   |   |   |   |   |   | 1 | 14 |
| 14 | 2 |   | 1 M | 10 M | Hr |   |   |   |   |   |   |   |   |   |   |   |   | 2 | 14 |
| 14 | 4 |   |   |   |   |   |   |   |   |   |   |   |   |   |   |   |   | 4 | 14 |
| 14 | 8 |   |   |   |   |   |   |   |   |   |   |   |   |   |   |   |   | 8 | 14 |
| 13 | 1 |   |   |   |   |   |   |   |   |   |   |   |   | 70 | 66 | 62 | 58 | 1 | 13 |
| 13 | 2 |   |   |   |   |   |   |   |   |   | 82 | 78 | 74 | 71 | 67 | 63 | 59 | 2 | 13 |
| 13 | 4 |   |   |   |   |   |   |   |   |   | 83 | 79 | 75 | 72 | 68 | 64 | 60 | 4 | 13 |
| 13 | 8 |   |   |   |   |   |   |   |   |   |   | 80 | 76 | 73 | 69 | 65 | 61 | 8 | 13 |
|    |   |   |   |   |   |   |   |   |   |   |   | 81 | 77 |   |   |   |   |   |   |
| 12 | 1 |   |   |   | 132 | 128 | 124 | 120 | 116 | 112 | 108 | 104 | 100 | 96 | 92 | 88 | 84 | 1 | 12 |
| 12 | 2 |   |   |   | 133 | 129 | 125 | 121 | 117 | 113 | 109 | 105 | 101 | 97 | 93 | 89 | 85 | 2 | 12 |
| 12 | 4 |   |   |   | 134 | 130 | 126 | 122 | 118 | 114 | 110 | 106 | 102 | 98 | 94 | 90 | 86 | 4 | 12 |
| 12 | 8 |   |   |   | 135 | 131 | 127 | 123 | 119 | 115 | 111 | 107 | 103 | 99 | 95 | 91 | 87 | 8 | 12 |
| 11 | 1 |   |   |   | 13th TEL DIGIT | 12th | 11th | 10th | 9th | 8th | 7th | 6th | 5th | 4th | 3rd | 2nd | 1st TEL DIGIT | 1 | 11 |
| 11 | 2 |   |   |   |   |   |   |   |   |   |   |   |   |   |   |   |   | 2 | 11 |
| 11 | 4 |   |   |   |   |   |   |   |   |   | < AUTO DIAL #2 > |   |   |   |   |   |   | 4 | 11 |
| 11 | 8 |   |   |   |   |   |   |   |   |   |   |   |   |   |   |   |   | 8 | 11 |
| 10 | 1 |   |   |   | 13th TEL DIGIT | 12th | 11th | 10th | 9th | 8th | 7th | 6th | 5th | 4th | 3rd | 2nd | 1st TEL DIGIT | 1 | 10 |
| 10 | 2 |   |   |   |   |   |   |   |   |   |   |   |   |   |   |   |   | 2 | 10 |
| 10 | 4 |   |   |   |   |   |   |   |   |   | < AUTO DIAL #1 > |   |   |   |   |   |   | 4 | 10 |
| 10 | 8 |   |   |   |   |   |   |   |   |   |   |   |   |   |   |   |   | 8 | 10 |
| 9 | 1 | INIT TEL REDIAL FLAG |   |   | 13th TEL DIGIT | 12th | 11th | 10th | 9th | 8th | 7th | 6th | 5th | 4th | 3rd | 2nd | 1st TEL DIGIT | 1 | 9 |
| 9 | 2 |   |   |   |   |   |   |   |   |   | < LAST NUMBER > |   |   |   |   |   |   | 2 | 9 |
| 9 | 4 |   |   |   |   |   |   |   |   |   |   |   |   |   |   |   |   | 4 | 9 |
| 9 | 8 |   |   |   |   |   |   |   |   |   |   |   |   |   |   |   |   | 8 | 9 |
| 8 | 1 | AON AOFF FLAG |   |   | < NOW TIME > PM/AM | PWR FAIL |   | < AUTO OFF > | 10 M | HR | PM/AM RUNTAIG | < ADN > < M 10 M HR > |   |   | PM/AM RUNTAIG |   |   | 1 | 8 |
| 8 | 2 |   | M | 10 M | HR |   |   | M |   |   | SET/MUT |   |   |   | SET/MUT |   |   | 2 | 8 |
| 8 | 4 |   |   |   |   |   |   |   |   |   |   |   |   |   |   |   |   | 4 | 8 |
| 8 | 8 |   |   |   |   |   |   |   |   |   |   |   |   |   |   |   |   | 8 | 8 |
| X | Y | 15 | 14 | 13 | 12 | 11 | 10 | 9 | 8 | 7 | 6 | 5 | 4 | 3 | 2 | 1 | 0 | Y | X |

When a telephone number is selected for automatic programming it is immediately stored in the appropriate RAM location for later transfer to the MNOS memory 218 for nonvolatile storage therein and recall therefrom. As shown in Table II, the upper RAM map provides a memory capacity for storing two programmed telephone numbers for automatic dialing, each containing up to thirteen digits. The present invention is not limited to the storage and recall of only two telephone numbers, since this system parameter is a function only of memory size and the general configuration and operation of the system described and claimed herein is compatible with the storage and recall of virtually any desired number of telephone numbers. RAM memory locations M(0,0), M(0,1), M(0,2) and M(0,3) form a scratch pad memory in RAM 86 for the temporary storage of digitally coded signals representing various operating parameters. These scratch pad memory locations and the temporary storage capability they provide reduce memory location addressing steps in the operation of microcomputer 216 which is described in detail below.

Information stored in RAM 86, which is a volatile memory, is lost when the receiver is turned off. However, information stored in ROM 84 is not lost either when the television receiver is turned off or when power is removed from the television/telephone system 210. When the television receiver is again turned on, the microcomputer program initializes RAM data from ROM 84 which causes the binary signals representing the first instructions stored in ROM 84 to be coupled to the CPU 74 and causes various other portions of the microcomputer 216 to be initialized for proper future operation when power is applied to the microcomputer. For example, when the television receiver is turned on the program counter (PC) 82 is initialized by means of a RESTART signal. Thus, the program proceeds to the initial instruction of the routine in ROM 84 and provides this instruction to CPU 74.

CPU 74 includes an instruction decoder (ID) 76, an accumulator (ACC) 78, and an arithmetic and logic unit (ALU) 80. Instruction decoder 76 receives instructions from ROM 84 provided to CPU 74 and analyzes their contents, initiates ALU and ACC operations, and provides a control signal to the program counter 82 which, in turn, directs the program to proceed to the next designated instruction in ROM 84. It is by means of this closed-loop instruction control system that ROM 84 provides the various control instructions to CPU 74 in carrying out the program stored in ROM 84. Accumulator 78 is a 4-bit register and is the primary working register of microcomputer 216. The contents of accumulator 78 derived from RAM 86 or earlier from ROM 84 are compared with the instructional data of ROM 84 and ALU 80 with the results of these comparators being stored in control bit locations in RAM 86. ALU 80 receives binary control signals from instruction decoder 76 and performs the required arithmetic and logic operations including addition, increment, Boolean logic operations, straight transfer, etc.

Input counter 70 in microcomputer 216 is connected to the filter network comprised of resistor 66 and grounded capacitor 68 to receive the pulse coded input command signals from remote control unit 136. Input voltages $V_P$ of +5 VDC and $V_G$ of +8 VDC are provided for energizing microcomputer 216. Input counter 70 performs as a binary series of flip-flops to permit gated counting of input pulses interrupted by periodic analysis of these input pulses with the subsequent contents of input counter 70 being provided to accumulator 78 in CPU 74. The counted pulses are then compared in ALU 80 with stored pulse counts in RAM 86 and preset data in ROM 84. Based upon this comparison logic analysis command signals are provided by means of instruction decoder 76 in CPU 74 to program counter 82 in directing the program to desired instruction locations generator 224. Also as a result of the comparisons and decisions made by ALU 80, data is transmitted from CPU 74 to RAM 86 where it is stored for further comparison with subsequent outputs from input counter 70. During this process ALU 80 is controlled by inputs from instruction decoder 76 which, in turn, is driven by various commands provided by ROM 84. This process is continued until all digits of the pulse coded telephone number transmitted by remote control unit 136 are received and stored in the designated control and display memory locations in RAM 86.

Microcomputer timing is provided by a series resonant device 72 both sides of which are connected to microcomputer 216 because of the high operating frequency of oscillator 72, i.e., 7.16 MHz. This permits most of the master clocking circuitry to be incorporated within the microcomputer 216 on a single "chip". One output of series resonant device 72 is coupled to the input of clock generator 88 with the other output of series resonant device 72 coupled to the output of clock generator 88. After processing, these clock pulses are provided to central processing unit 74 and to input counter 70 in its role of counting input pulses and detecting remotely generated control commands.

Also incorporated in the microcomputer 216 are portions of a phase lock loop (PLL) comprised of 12-bit reference counter 90, 11-bit programmable counter 94, phase detector 92, low pass filter 96, tuner/local oscillator 98, and prescaler 100 together with associated circuitry. In the present invention, indirect frequency synthesis is utilized in a conventional manner in which a PLL utilizes the tuner/local oscillator 98 as its voltage controlled oscillator (VCO). In the PLL, the master timing control frequency of series resonant device 72 is divided by a multi-stage divider network, the programmable 12-bit reference counter 90, to provide a divided-down signal to phase comparator 92. The other input to phase comparator 92 is provided by the local oscillator of tuner 98. The frequency division chain from the local oscillator in tuner 98 to phase comparator 92 consists of a fixed divide by 256 prescaler 100 and a multi-stage 11-bit programmable divider or counter 94. The programmable portion of counter 94 divides by the numerical value of the frequency of the local oscillator in megahertz for the channel selected. The output of reference counter 90 provides a second input to phase comparator 92.

When the signal from programmable counter 94 and the signal from reference counter 90 to phase comparator 92 are exactly equal, the comparator output is 0. When there is any difference in these two frequencies, phase comparator 92 will develop an output which, when passed through low pass filter (LPF) 96, provides a correction voltage until the two signals have exactly the same frequency. The tuner local oscillator 98 then assumes the stability of series resonant device 72 and an oscillator signal is provided via line 99 to appropriate signal receiving circuitry (not shown) in the television receiver. This frequency comparison is done continually in order to compensate for turner oscillator drift.

The output of phase comparator 92 is a series of pulses the duty cycle of which is dependent on the difference between the reference frequency and the divided-down local oscillator frequency. LPF 96 provides adequate filtering of the frequency correction signals so that there is no perturbation on the tuning line while allowing for a quick response to a new tuning voltage.

Digital-to-analog converter (DAC) 106 is driven by the output of resonant device 72 and is modulated by a control signal from CPU 74. The control signal from CPU 74 provides for the pulse width modulation (PWM) of the output of DAC 106. The duty cycle of the output of DAC 106 is thus controlled internally by the program stored in ROM 84 to provide a PWM output signal for volume control of the television receiver in the television mode of operation and the telephone speaker 33 in the telephone mode of operation. The PWM signals from DAC 106 are provided to output latches 102 and thence to LPF 108 where this digital signal is integrated to provide a DC analog output signal for driving conventional volume control circuitry (not shown).

Additional tuning outputs are provided from RAM control memory locations to output latches 102 to provide proper band switching signals to the television receiver interface circuit 220. These band switching signals are then provided via lines 101 to various voltage responsive, variable resonant frequency circuit elements (not shown) in the television receiver. This permits the television receiver in the television mode of operation to tune to the proper band, e.g., VHF, UHF, CATV, or Superband, depending upon the channel number selected. In addition, automatic frequency control (AFC) and vertical synchronization information are provided to input latches 104 for television signal acquisition and tuning by means of tuning process steps stored in ROM 84 for controlling tuner 98.

When a desired telephone number is entered on the keyboard 244 of remote control unit 136, the pulsed output of input counter 70 is provided to instruction decoder 76 in CPU 74. These received pulses are then temporarily stored in accumulator 78 and later compared in ALU 80 with program data recalled from ROM 84. When command inputs are received and verified by the program in the microcomputer 216 as being valid commands, the individual commands, following program analysis in ALU 80, are stored in selected memory locations in RAM 86. This is a sequential process for as subsequent commands are detected by input counter 70 they are similarly stored in appropriate memory locations in RAM 86 until an entire legal code is detected by CPU 74 which sets a flag in a predetermined memory site in RAM 86. When the program later detects this flag in RAM 86 the stored command code is read from RAM 86 and provided to ALU 80 and to accumulator 78 from which it is transmitted to output latches 102. Thus, when a valid telephone command and telephone number dialing sequence is received by input counter 70 these command signals are eventually provided to output latches 102.

Output latches 102 of microcomputer 216 provides several outputs to character generator 224 including program control and alpha-numeric character display information. Any of the more conventional character generators may be used in the present invention as the particular design and operation of character generator 224 does not form a part of the present invention. In the preferred embodiment of the present invention, character generator 28 is an N-channel, LOCOS, E/D MOS integrated circuit which is capable of providing a 60 character display having 5 rows of 12 characters each to video display 228. A video display character generator program is stored in a ROM (not shown) in character generator 224 which controls the processing of digital signals therein in accessing the 66 RAM words stored in available RAM (not shown) memory locations. The character generator 224 utilized in a preferred embodiment of the present invention is described in co-pending patent application Ser. No. 260,639, filed May 4, 1981, entitled "Character Generator with Latched Outputs", in the names of Jeffery Puskas, Peter C. Skerlos and Thomas J. Zato, the detailed description of which is hereby incorporated by reference in the present application.

Figure 4:
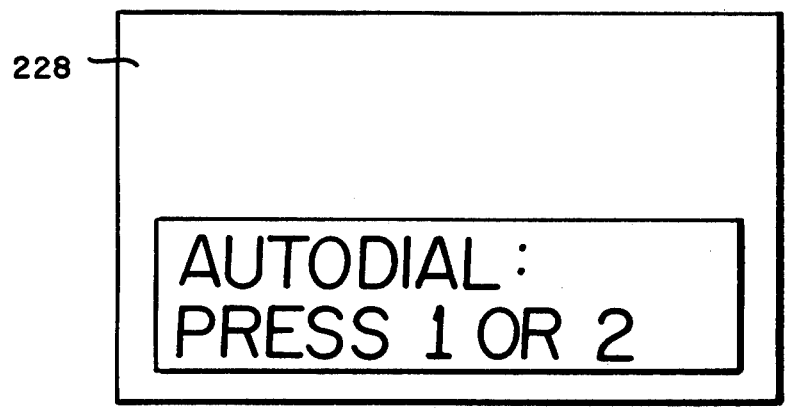
FIG. 4 shows a typical alpha-numeric display on the television receiver's video display in the automatic dialing mode prior to storing in or recalling from memory a predetermined telephone number.
Figure 5:
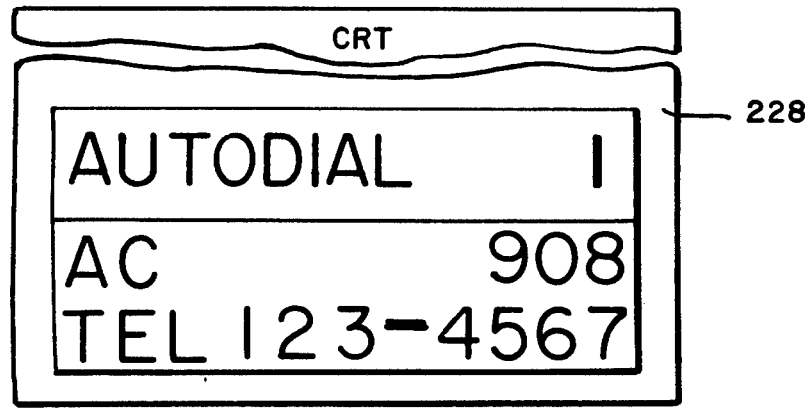
FIG. 5 illustrates a typical video display presentation in the automatic dialing mode of operation showing the stored contents in one location of the nonvolatile memory.

The information presented on the video display 228 in response to inputs from the character generator 224 will now be described with reference to FIGS. 4 and 5. For programming a telephone number in memory, the AUTODIAL key 254 is initially selected and display information as shown in FIG. 4 is presented. The top, or second, line of the display includes the words AUTODIAL, indicating the mode of operation the television/telephone system 210 presently is in, while the bottom, or first, line of the display contains the user instruction PRESS 1 OR 2. This instruction refers to MNOS memory locations 1 and 2 as shown in Table III for accessing and storage of the telephone number in one of these memory locations. These memory locations may be accessed by selecting the corresponding number on the alpha-numeric keyboard 244. This is then followed by entry of the telephone number to be stored on the alpha-numeric keyboard 244 with the characters sequentially moved from right to left and from a lower to an upper line once the immediately lower line is filled with characters. This is shown in FIG. 5 which illustrates the general form the display takes following the selection of an alpha-numeric key representing one of the memory locations in which a telephone number may be stored for later recall and the entry of the desired telephone number.

TABLE III

| | | AUTO DIAL #2 | | AUTO DIAL #1 | | | | CHANNELS NORMAL & CATV | | | | | | | | | |
|---|---|---|---|---|---|---|---|---|---|---|---|---|---|---|---|---|---|
| 3 | 1 | | | | | | | 54 | 50 | 46 | 42 | 38 | 34 | 30 | 26 | 1 | G3 |
| | 2 | | | | | | | — | 51 | 47 | 43 | 39 | 35 | 31 | 27 | 2 | |
| | 4 | — | XII | VIII | IV | — | 12 | 8 | 4 | — | 52 | 48 | 44 | 40 | 36 | 32 | 28 | 4 | |
| | 8 | | | | | | | — | 53 | 49 | 45 | 41 | 37 | 33 | 29 | 8 | |
| 2 | 1 | | | | | | | 60 | 56 | 52 | 48 | 44 | 40 | 36 | 32 | 1 | G2 |
| | 2 | | | | | | | 61 | 57 | 53 | 49 | 45 | 41 | 37 | 33 | 2 | |
| | 4 | — | XI | VII | III | — | 11 | 7 | 3 | 62 | 58 | 54 | 50 | 46 | 42 | 38 | 34 | 4 | |
| | 8 | | | | | | | 63 | 59 | 55 | 51 | 47 | 43 | 39 | 35 | 8 | |

TABLE III-continued

| | | AUTO DIAL #2 | | | | AUTO DIAL #1 | | | | CHANNELS NORMAL & CATV | | | | | | | | | | |
|---|---|---|---|---|---|---|---|---|---|---|---|---|---|---|---|---|---|---|---|---|
| 1 | 1 | | | | | | | | | 22 | 18 | 14 | 80 | 76 | 72 | 68 | 64 | 1 | G1 | |
| | 2 | | | | | | | | | 23 | 19 | 15 | 81 | 77 | 73 | 69 | 65 | 2 | | |
| | 4 | — | X | VI | II | — | 10 | 6 | 2 | 24 | 20 | 16 | 82 | 78 | 74 | 70 | 66 | 4 | | |
| | 8 | | | | | | | | | 25 | 21 | 17 | 83 | 79 | 75 | 71 | 67 | 8 | | |
| 0 | 1 | | | | | | | | | 28 | 24 | 20 | 16 | 12 | 8 | 4 | 0 | 1 | G0 | |
| | 2 | | | | | | | | | 29 | 25 | 21 | 17 | 13 | 9 | 5 | 1 | 2 | | |
| | 4 | XIII | IX | V | I | 13 | 9 | 5 | 1 | 30 | 26 | 22 | 18 | 14 | 10 | 6 | 2 | 4 | | |
| | 8 | | | | | | | | | 31 | 27 | 23 | 19 | 15 | 11 | 7 | 3 | 8 | | |
| X | Y | 15 | 14 | 13 | 12 | 11 | 10 | 9 | 8 | 7 | 6 | 5 | 4 | 3 | 2 | 1 | 0 | Y | X | |

As the telephone number is entered by means of the remote controller 136, the selected alphanumeric characters appear on the video display 228 while being stored in the microcomputer's RAM 86. When the entry of the desired telephone number in RAM 86 is complete, the selection of the ENTER/RECALL key 246 causes the alpha-numeric characters to be removed from the video display 228 and the contents of RAM 86 representing the entered telephone number to be transferred to MNOS memory 218 for storage therein and subsequent recall.

In the automatic dialing procedure, the TELEPHONE MODE selector 250 is initially selected which results in the presentation as shown in FIG. 4 appearing on the video display after the AUTODIAL key 254 is selected. The alpha-numeric key representing the MNOS memory location in which the desired telephone number is stored is then selected resulting in a video display presentation of the contents thereof, as shown in FIG. 5. Selection of the ENTER/RECALL key 246 results in the transmission of signals representing the stored telephone number to the telephone line for initiating the telephone call and the removal of the alpha-numeric characters from the video display 228. During telephone number dialing, the speaker 33 is muted in response to an output signal provided by microcomputer 216 via the character generator 224 to the telephone interface circuit 230 to undesirable audio clicks due to the opening and closing of relay 36 from being heard over the television receiver's speaker 33.

When a 7-digit phone number is dialed, it is displayed in one row near the bottom of video display 228. The number is preceded by the letters TEL as shown in FIG. 5. Area codes when dialed for long distance calls are first displayed in row one but are subsequently moved up to the second row after the entry of the telephone number. These digits are preceded by the letters AC. For overseas calls up to 13 digits can be displayed on the video display 228. If more than 13 digits are required, all digits will be dialed but only the last 13 will be displayed on video display 228. The phone number display can be removed from the screen by either waiting for a 30 second time out period programmed into microcomputer 216 or by depressing the ENTER/RECALL key 246 twice on the remote control transmitter 136. The present invention is not limited to the presentation of a dialed telephone number or time and channel number on a CRT-type of video display. Such information could equally as well be displayed on a great variety of displays, e.g., a light emitting diode (LED) display which presently is commonly used to display a channel number. State of the art techniques could as easily permit the display of a dialed telephone number on an LED display. Driving an LED display directly by means of a microcomputer is presently well known in the art and in such a configuration character generator 224 would not be needed. Microcomputer 216 could directly drive a standard LED display or any number of other standard display devices.

RAM location (3,12) in the lower RAM map shown in Table I contains the telephone control bit. Bit one of this RAM data word is designated SD/P and controls a privacy mode whereby the microphone 31 on the television receiver is muted so that the other telephone subscriber is unable to hear conversations in the vicinity of the television/telephone system 210. Bit 2 of this RAM data word is designated TEL and controls mode selection from telephone to television operation and vice versa. When the telephone mode selector 250 is selected, bit 2 of lower RAM memory location (3,12) is toggled. This change of state is read from RAM 86 and provided to the appropriate RAM address in character generator 224. Character generator 224, in turn, reads this RAM memory location and provides the appropriate output to telephone interface circuit 230. This output is designated "Telephone" in FIG. 3. Similarly, a "privacy" signal is provided to processing circuitry 34 in telephone interface circuit 230 when the MUTE/PRIVACY mode selector 252 is selected on remote control unit 136. If the MUTE/PRIVACY mode selector 252 is selected while in the television mode of operation the audio output from the television receiver is muted.

The character generator 224 provides two outputs to video display 228, a character output drive pulse and a background output drive pulse. Various inputs are provided to character generator 28 which are not shown in FIG. 3 such as horizontal and vertical synchronizing pulses in carrying out conventional "bookkeeping" functions in driving video display 228.

The MNOS (metal-nitride-oxide-semiconductor) memory 218 is of conventional design and may employ any of the more conventional memory IC's. A plurality of lines couple the MNOS memory 218 with the output latches 102 of microcomputer 216. Operating mode data is latched at the input negative edge of a "chip enable" pulse provided from microcomputer 216 to the MNOS memory 218 on line 73. Data provided from microcomputer 216 to the MNOS memory is then latched or a new mode of operation, e.g., television or telephone mode, is then initiated corresponding to the mode of operation at the positive edge of the "chip enable" pulse. Data is provided from microcomputer 216 via lines 75, 77 and 79 to the MNOS memory 218 for storage and subsequent recall. This data is initially stored in the microcomputer's RAM 86 following receipt of the remotely generated control signals from the remote control transmitting unit 136. This data is then read out from RAM 86 under the control of the microcomputer's CPU 74 and provided via the aforementioned lines to the MNOS memory 218. When a number is selected for automatic dialing, the appropriate memory location in MNOS memory 218 is addressed by means of microcomputer 216, the appropriate digital data is read therefrom by the microcomputer, and this data is then provided via the microcomputer's RAM 86 and output latches 102 to the character generator 224 which provides the appropriately coded signal information to the telephone interface circuit 230. The data corresponding to the alphanumeric characters of the selected telephone number is then provided to the telephone line via the isolation relay 36 and the isolation transformer 37. The leading and trailing edges of the "chip enable" pulse provided via line 73 to the MNOS memory 218 controls the reading and writing of information in the MNOS memory, or the direction in which data is transferred on lines 75, 77 and 79.

The MNOS memory 218 includes a 16×16 memory cell array for storing channel and telephone number information. As shown in the MNOS map of Table III, channel number information is stored in the first eight columns and four rows of the MNOS cell memory array. Similarly, columns 8–11 and rows 0–3 are reserved for storing the alpha-numeric characters of a first telephone number for automatic dialing. Columns 12–15 and rows 0–3 are similarly utilized for storing a second telephone number for automatic dialing purposes. When the input mode is latched in the MNOS memory via line 73, a latched group counter (not shown) is specified by the data of lines 75, 77 and 79. When the address data is latched, MNOS memory data of the specified address is provided to the appropriate terminals of the memory cell array. A latch group counter is automatically incremented during data input to the MNOS memory. Read and write modes of the MNOS memory 218 are controlled by the leading and trailing edges of the "chip enable" signal provided thereto via line 73. Data is removed from the memory cell array in response to the receipt of the appropriate edge of the "chip enable" signal and data is read out of the MNOS memory and provided to the microcomputer 216 in a conventional manner. An MNOS memory IC utilized in a preferred embodiment of the present invention is described in a document entitled "MN1208, MN1218-PROM/256-Bit MNOS Electrically Programmable Nonvolatile Memory", published by Panasonic Company.

The manner in which digital signals are processed in the television/telephone system 210 in automatically providing a predetermined telephone number to the telephone line and displaying the automatically dialed telephone number on the video display 228 of a television receiver will now be explained with reference to the flow charts shown in FIGS. 6–11. In referring to FIGS. 6–11 an oval symbol indicates the start of an operational sequence, a diamond symbol indicates a decision point based upon the comparison of binary signal inputs, and a rectangle indicates an instruction or a set of instructions resulting in the performance of a control function. The computer listing for the automatic telephone number dialing sequence shown in FIGS. 6–11 is presented in Table IV. Included in this program assembly listing, processing from left to right and arranged in columns, or fields, is such information as read only memory (ROM) addresses in microcomputer 216 ranging from 000 to FFF, object code for instructions stored in the microcomputer's ROM, source statement number, subroutine instructions in mnemonic form, and various descriptive labels of the operands in the program including, lastly, a comment describing in plain English program operation. In referring to FIGS. 6–11, the ROM addresses of various operational steps in the program depicted therein are included immediately to the left of a designated operation. Detailed information on the symbology utilized in Table IV may be found in the publication "4-bit One Chip Microcomputer MN1400 Series", published by Matsushita Electronics Corporation. This publication also includes detailed information regarding the operation and configuration of the microcomputer chip utilized in a preferred embodiment of the present invention. However, the present invention is not limited to the use of a particular microcomputer but is compatible with any of the more conventional microcomputer chips currently available which could be integrated in the present invention with only minor modifications well known to those skilled in the relevant art.

Figure 6:
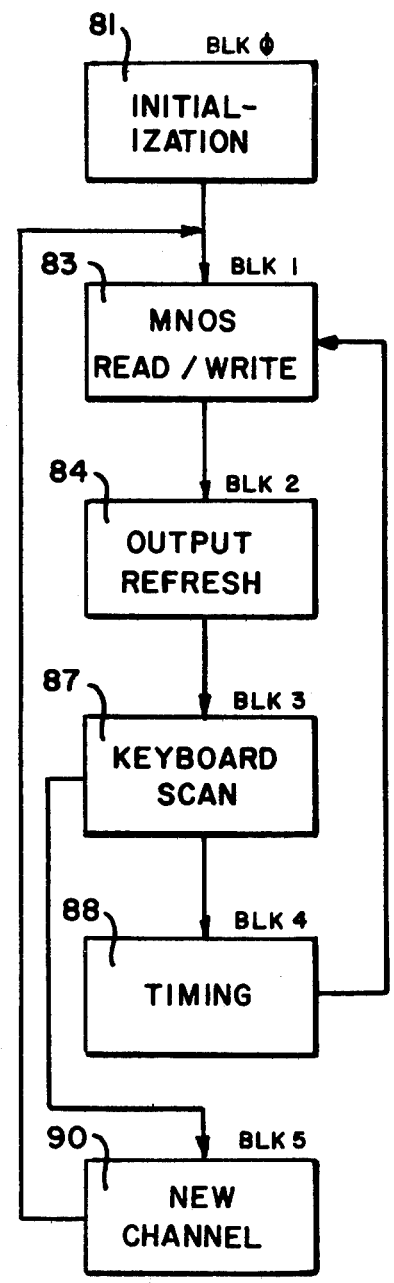
FIG. 6 is a flow chart illustrating the sequence of operations implemented by the microcomputer in the television/telephone system of the present invention in controlling overall system operation.

Referring to FIG. 6, there is shown a general block diagram in the program implemented by the microcomputer 216 in carrying out the automatic telephone number dialing of the present invention. The program begins with an INITIALIZATION 81 routine in which the outputs of the system are initialized, the microcomputer's RAM is cleared, and various other routine housekeeping functions are performed. The INITIALIZATION 81 routine is accomplished when the television/telephone system is first connected to an AC source. The program then proceeds to an MNOS READ/WRITE routine 83 wherein the non-volatile MNOS memroy 218 exchanges stored data with the microcomputer 216. For example, following the initial plug-in of the television/telephone system 210 data will be read from the MNOS memory 218 and provided to the microcomputer's RAM 86. Similarly, in programming the MNOS memory, data is read from the microcomputer's RAM 86 and stored in the MNOS memory 218 for later recall in automatically dialing a stored telephone number. The program then proceeds to an OUTPUT REFRESH routine 84 where the various outputs of the microcomputer 216, such as to the character generator 224, for displaying the selected channel number, etc., are updated. The program then proceeds to a KEYBOARD SCAN routine 87 where a flag is set in the program indicating that the system is in the programming mode of operation and that a new telephone number is about to be stored in the MNOS memory 218. The programming mode is initiated upon the selection of the automatic dial selector 254 on the remote control transmitting unit 136, as described in detail below. Following selection of the automatic dial key 254, the program then initiates the display as shown in FIG. 4 on the video display 228 and awaits subsequent user entries. The program then proceeds to a TIMING routine 88 and branches back to the MNOS READ/WRITE routine 83. If the automatic dial key 254, the digits of the desired telephone number 244, and the ENTER/RECALL key 246 have been selected, the flag set in the microcomputer's RAM in response to the selection of the aforementioned keys is then detected in the MNOS READ/WRITE routine 83 and the user initiated inputs are then read from RAM 86 into the MNOS memory 218. If in the KEYBOARD SCAN routine 87, the program does not detect the selection of the automatic dial key 254, the program then proceeds to the TIMING routine 88 and branches back to the MNOS READ/WRITE routine 83 to continue previously initiated READ/WRITE operations, or simply transmits this routine if no operations are running.

Figure 7:
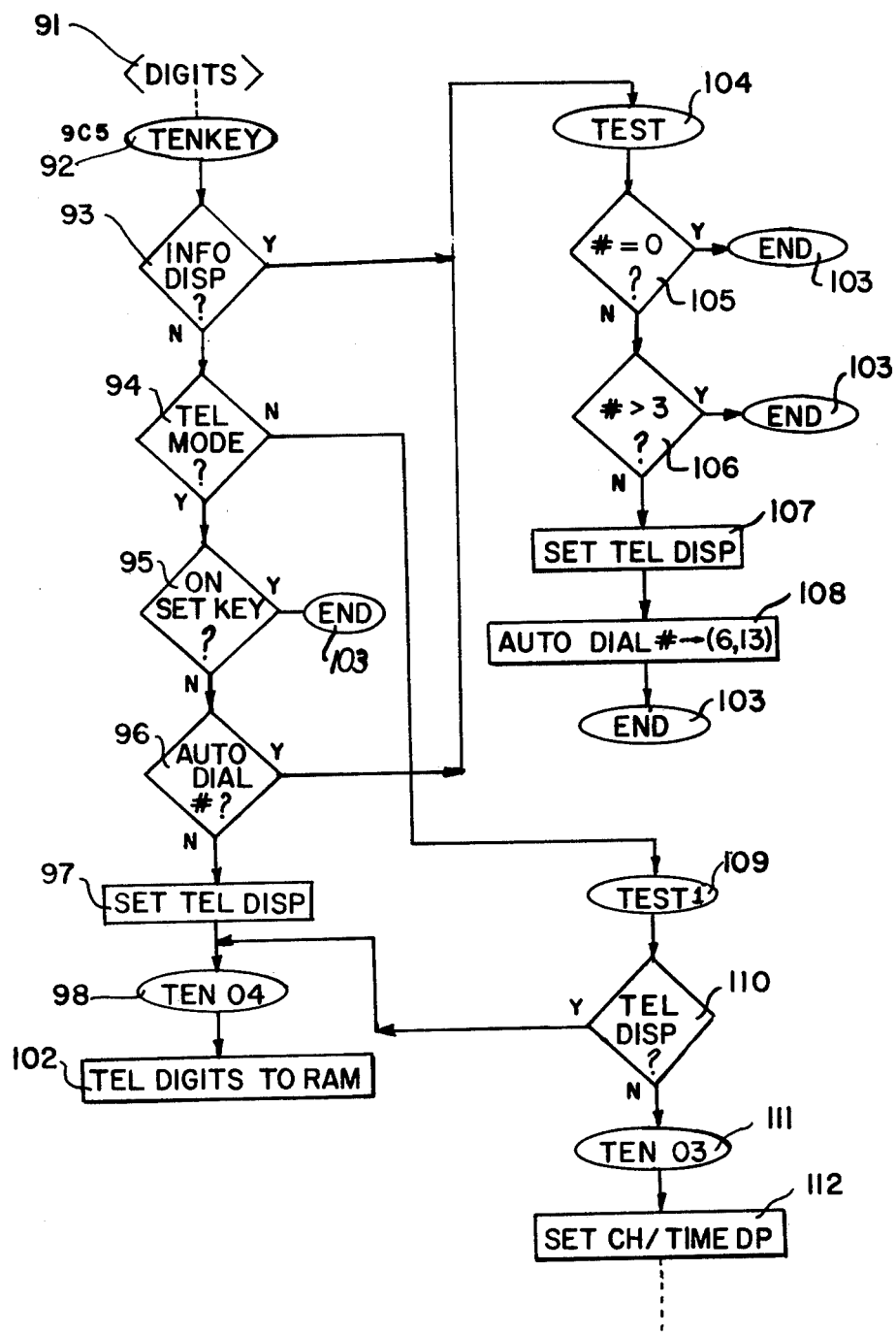
FIG. 7 illustrates a flow chart representing the sequence of operations during the keyboard scan subroutine carried out by the microcomputer in the television/telephone system of the present invention.

One subroutine executed by the program in the KEYBOARD SCAN routine 87 of FIG. 6 is the TENKEY subroutine 92 as shown in FIG. 7. In general, this subroutine involves the control of the microcomputer's RAM 86 in accordance with the program stored in its ROM 84 in response to user inputs provided via the remote control transmitting unit 136. The TENKEY subroutine 92 involves various checks to determine if the digits entered in step 91 should be stored in the MNOS memory 218 as a valid telephone number. The first check involves an INFORMATION DISPLAY determination 93 wherein the program determines whether the information display of FIG. 4 is presented on the video display. If the system is in the information display mode as shown in FIG. 4, the program proceeds to the TEST step 104. If the system is not in the information display mode, the program proceeds to the TELEPHONE MODE CHECK 94 to determine if a telephone mode key 250 has been selected. If the telephone mode key 250 has not been selected the program proceeds to a TEST 1 step 109. If the telephone mode key 250 has been selected, the program proceeds to an ONSET KEY DETECT step 95 and if the selection of digits is detected, the program then exits this subroutine via an end step 103. If the selection of keys in step 95 is not detected, the program then proceeds to a AUTODIAL NUMBER DETECT step 96, and if the selection of a speed number corresponding to an MNOS memory location in which a selected telephone number is stored has been made, the program proceeds to the TEST step 104 where it determines whether the speed number selected is within the range of the MNOS memory locations in which predetermined telephone numbers are stored.

In the example of the present invention, only two MNOS memory locations, designated 1 and 2, are utilized so that the program first determines whether the AUTODIAL number selected is 0 or greater than 3 in steps 105, 106 and if the number thus detected is between 0 and 3, the program proceeds to a set TELEPHONE DISPLAY step 107 and initiates the display of new data on the video display as shown in FIG. 5. This new data is the valid telephone number recalled from the selected MNOS memory location. If the AUTODIAL number selected is not one in which a selected telephone number is stored, the program exits the TENKEY subroutine via an END step 103. After the video display is reprogrammed to present the telephone number thus recalled from the MNOS memory 218, the contents of the MNOS memory location in which the selected AUTODIAL number is stored are provided to RAM memory locations at rows 9 or 10, depending upon the automatic dial number stored at RAM memory location (6, 13), to permit the program to output the selected number from the microcomputer's RAM when the overall program returns to the OUTPUT REFRESH step 84 during the next cycle of the program. Thus, the TENKEY routine 92 primarily involves the detection of the telephone mode of operation and the recall from the MNOS memory of the stored telephone number and the reading out therefrom of that number and providing the stored telephone number to the microcomputer's RAM 86.

If the telephone mode of operation is not detected in step 94, the program proceeds to a TEST 1 109 subroutine where it checks to see if the system is in the telephone display mode 110. If the system is not in the telephone display mode of operation, the program proceeds to the TEN 03 step 111 for presenting channel and time display information on the video display in step 112.

If the selection of a AUTODIAL number is not detected in step 96 the program proceeds to a set TELEPHONE DISPLAY step 97 in preparation for programming the microcomputer's RAM. Similarly, if the telephone display mode of operation is detected in step 110, the program proceeds to a TEN 04 step 98 where the digits entered via the remote control transmitting unit 136 are sequentially provided to the microcomputer's RAM 86 for temporary storage therein prior to storage in the MNOS memory 218.

Figure 8:
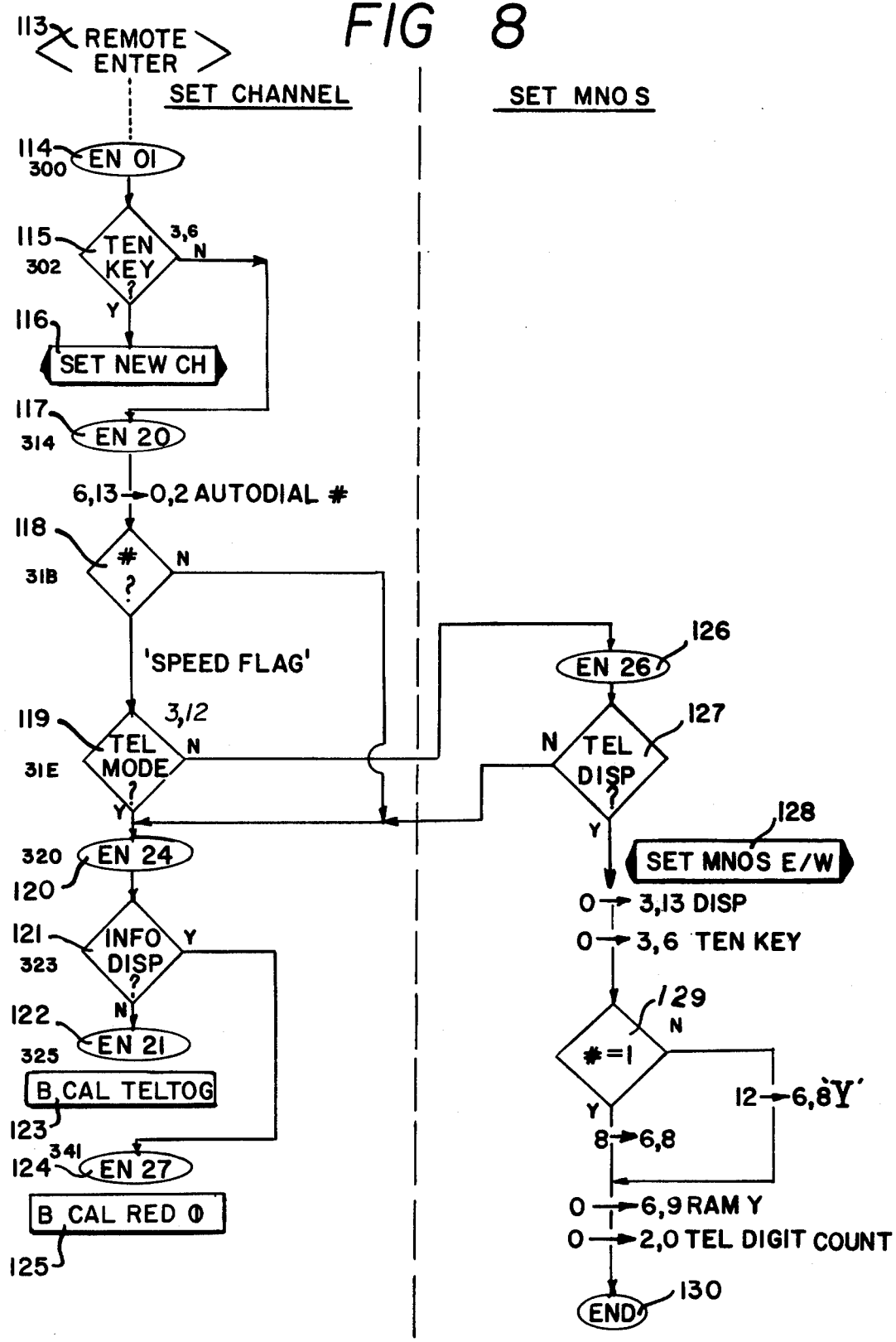
FIG. 8 shows a flow chart illustrating the sequence of events carried out by the microcomputer in entering a selected telephone number via the remote control system in the present invention.

Following the TENKEY routine 92, the program next executes a REMOTE ENTER subroutine 113 which also is executed in the KEYBOARD SCAN routine 87 of FIG. 6. The REMOTE ENTER subroutine 113 is shown in FIG. 8 and in general involves the detection of the selection of the ENTER/RECALL key 246 on the remote control transmitting unit 136 and the setting of a new channel if in the television mode of operation or the storage of a new telephone number in the MNOS memory 218 if in the telephone mode of operation. The NEW CHANNEL set subroutine is shown generally to the left of the dotted line in FIG. 8, while the set MNOS memory subroutine is generally shown to the right of the vertical dotted line in FIG. 8.

Following detection of the selection of the remote ENTER/RECALL key 246, the program branches to the EN 01 subroutine 114. The program first checks to see if the TENKEY flag has been set in the microcomputer's RAM in step 115, and if this flag has been set, the program enters the digits of the selected new channel in the microcomputer's RAM in step 116. The television receiver is then tuned to the selected new channel. This is accomplished by the program proceeding from the KEYBOARD SCAN block 87 shown in FIG. 6 to the NEW CHANNEL block 90 prior to branching back to the MNOS READ/WRITE routine 83.

If the TENKEY routine is not detected in step 115, the program branches to the EN 20 subroutine 117 where the selected AUTODIAL number is read from RAM memory location (6, 13) and temporarily stored in RAM scratch pad memory location (0,2). The program next checks to see if a valid AUTODIAL number has been selected at step 118, and if a valid AUTODIAL number has been selected, the program sets a control flag designated SP in the RAM 86 and executes the SP instruction to determine if the system is in the telephone mode of operation at step 119. If in the telephone mode of operation, the program next proceeds to the EN 24 subroutine 120 and checks for the presence of the information display at step 121. If the information display is not present, the program branches to the EN 21 subroutine 122 and thence to BCAL TELTOG 123 for executing another subroutine in the overall automatic dial out program. If the information display is detected in step 121, the program branches to the EN 27 subroutine 124 for toggling the channel/time display and exiting the REMOTE ENTER routine 113 at the BCAL RED0 step 125.

If in step 119 the telephone mode of operation is not detected, the program branches to EN 26 at step 126 where a check is performed to see if the system is in the TELEPHONE DISPLAY mode 127. If not in the TELEPHONE DISPLAY mode, the program branches to EN 24 at step 120 and exits the REMOTE ENTER subroutine as previously described. If in the telephone display mode of operation, the program next sets MNOS E/W flags in RAM 86 in clearing the alphanumeric characters presented on the video display and initializing the MNOS write operation, A 0 is provided to RAM location (3, 13) which clears the display flag. A 0 is also provided to (3, 6) in RAM which clears the TENKEY flag and sends the telephone AUTODIAL number to a different RAM location for proper MNOS memory addressing. The program next detects the AUTODIAL number in step 129. If the AUTODIAL number is 1, the program sets a TELEPHONE WRITE flag at loction (6, 8) in RAM and reads the contents of the AUTODIAL number in RAM into the Y=8 location in the MNOS memory. If in step 129 the AUTODIAL number 1 is not detected, then the AUTODIAL number must be 2 and the speed dial telephone number temporarily stored in RAM is read therefrom and provided to the Y=12 location in the MNOS memory. A 0 is provided to location (6,9) for initializing RAM 86. Similarly 0 is provided to the scratch pad register location (2,0) in RAM 86 for initializing the readout of RAM 86 to the MNOS memory 218. The aforementioned steps initialize the readout of the telephone number information in rows 10 or 11 of the upper RAM map of Table II and its transfer to the appropriate locations, either the AUTO DIAL 1 or the AUTO DIAL 2 positions, in the MNOS memory 218. The program then exits the REMOTE ENTER routine 113 and returns to the general automatic dial out program at the KEYBOARD SCAN portion 87 thereof as shown in FIG. 6.

Figure 9:
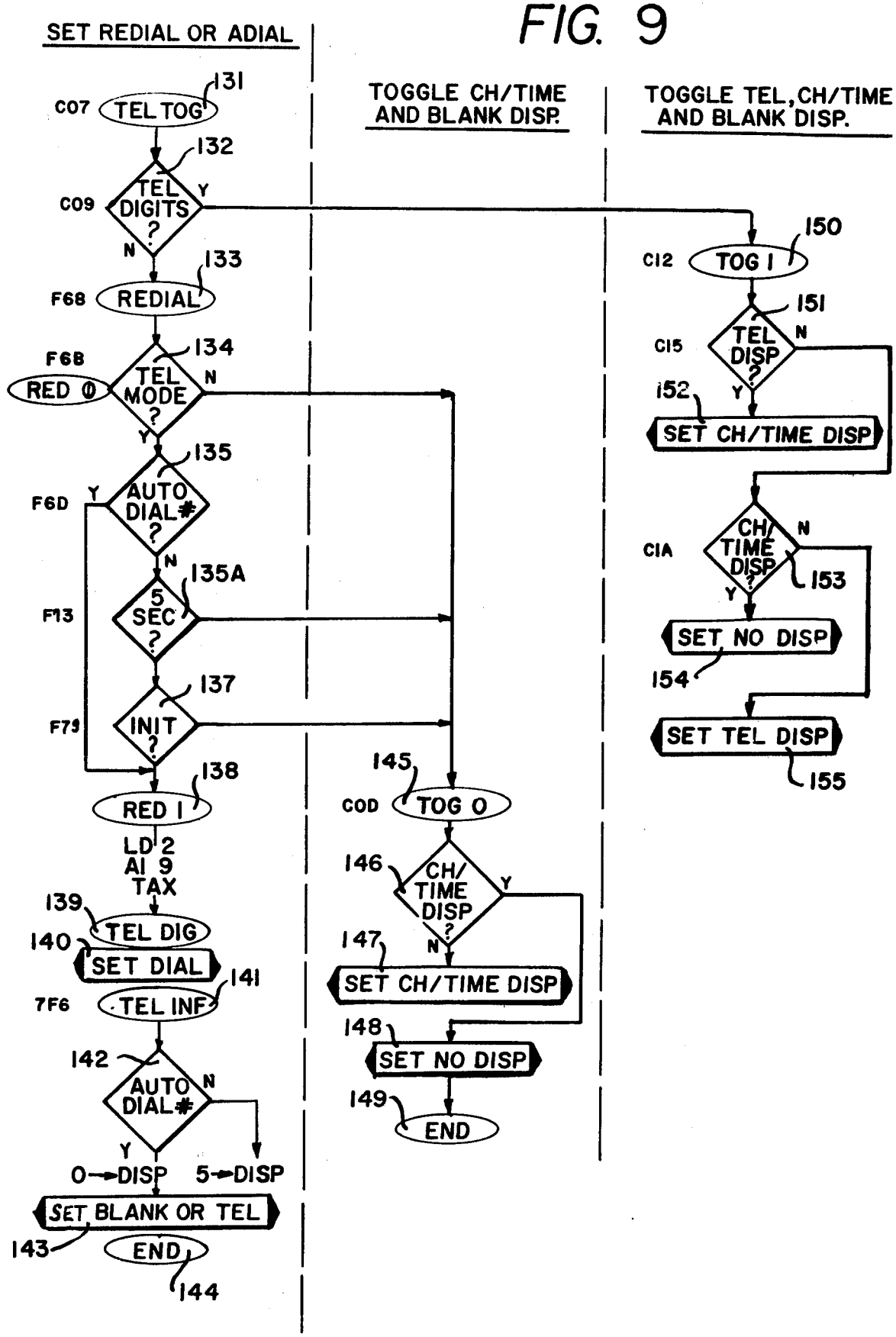
FIG. 9 illustrates the sequence of events as carried out by the microcomputer in the present invention for automatically dialing a stored telephone number and displaying the recalled and dialed number on the television receiver's video display.

The TELTOG routine 131 is shown in FIG. 9. This subroutine generally relates to the radial or automatic dial out of a predetermined, stored telephone number, the toggling of the video display to present channel and time information and the toggling of the video display to present a stored telephone number or channel and time information, in proceeding from left to right as illustrated in FIG. 9. The program initially checks to see if any telephone number digits have been selected at step 132 and if the answer is in the negative, the program proceeds to a REDIAL step 133 and determines whether the system is in the TELEPHONE mode of operation at step 134. If in the TELEPHONE MODE of operation, the program proceeds to determine whether or not a AUTODIAL NUMBER has been selected at step 135. If a telephone AUTODIAL number has been selected, the program proceeds to RED 1 at step 138 and reads the telephone AUTODIAL number from RAM location (0,2), adds 9 to that number and establishes the X address of the telephone number in RAM 86. The contents of the accumulator 78 in the microcomputer 216 are then provided to the X-register in RAM 86 which sets a flag in initializing the dial out operation. The program then proceeds to TELDIG step 139 in initiating the SET DIAL function 140 in which telephone dialing information is displayed on the video display in steps 141 and 142 followed by the blanking of the video display in step 143. Following the display of the AUTODIAL number, the program exits this subroutine and returns to the general automatic dialing program at step 144.

If prior to entering the TELTOG routine 131, telephone digits had been entered, the program proceeds to TOG 1 at step 150 where the program checks to see if the system is still in the TELEPHONE DISPLAY mode of operation at step 151. If the system is still in the TELEPHONE DISPLAY mode of operation, the program sets the channel and time display at step 152. If the system is no longer in the TELEPHONE DISPLAY mode of operation at step 151, the program branches to the SET CHANNEL AND TIME DISPLAY subroutine at step 153 followed by the SET NO DISPLAY subroutine at step 154. If the system is not in the CHANNEL AND TIME DISPLAY mode as detected at step 153, the program branches to the SET TELEPHONE DISPLAY at step 155 for displaying the selected telephone number. Thus, each time after the selection of the remote ENTER/RECALL key 246, the program proceeds in a circular manner from the telephone display mode to the channel and time display mode to a no display status and then back to the telephone display mode.

Figure 10:
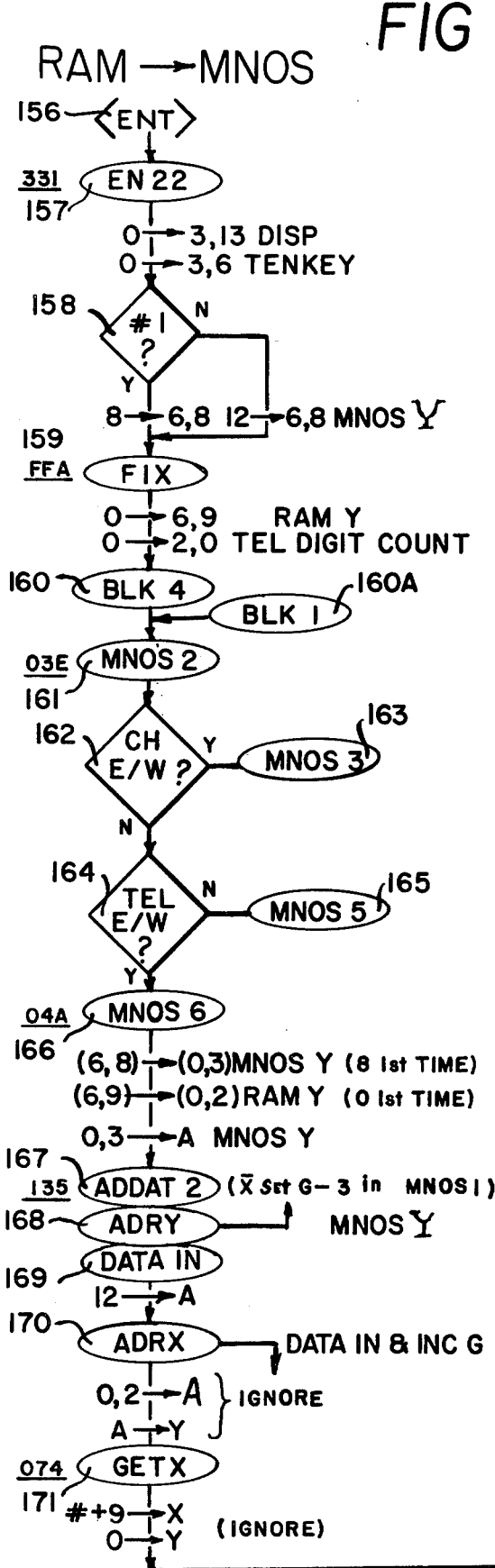
FIG. 10 is a flow chart illustrating the sequence of events under the control of the microcomputer in programming the nonvolatile memory with a selected, user entered telephone number for later speed dialing recall.
Figure 10:
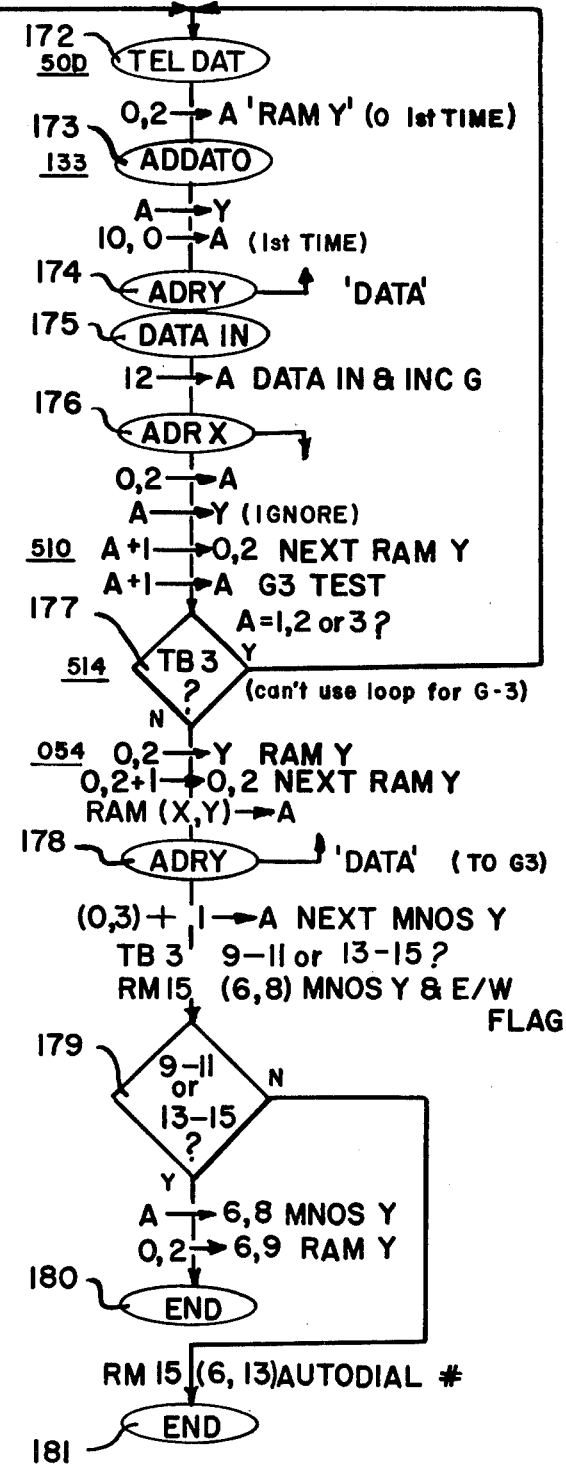

Referring to FIG. 10, there is shown the program operation for the transfer of a telephone number from RAM locations (10,0) through (10,12) or from (11,0) through (11,12) to the Y=8-11 or Y=12-15 locations respectively in the MNOS memory 218. Following selection of the remote ENTER/RECALL key 246 at step 156, the program proceeds to the EN 22 routine at step 157 wherein the display is cleared by providing 0 to the (3,13) location in RAM 86 and the TENKEY flag is cleared by providing a 0 to the (3,6) location in RAM 86. The program next determines if AUTODIAL NUMBER 1 has been selected at step 158 and if so, provides the number 8 to RAM location (6,8) in establishing where the first digit from the RAM is to be provided in the MNOS memory. If the AUTODIAL NUMBER 1 is not detected at step 158, the program provides the first RAM digit to the Y=12 location in the MNOS memory. The program then enters the FIX subroutine at step 159 and sends a 0 to RAM location (6,9) for setting the RAM Y location and provides 0 to the (2,0) location in counting the number of digits entered in RAM. The BLK 4 at step 160 then updates system timing and the system returns to BLK 1 at step 160A where all of the MNOS-related routines occur. In the MNOS 2 routine at step 161, the program checks for a CHANNEL ERASE/WRITE operation at step 162 and a TELEPHONE NUMBER ERASE/WRITE operation at step 164. If a CHANNEL ERASE/WRITE operation is detected, the program branches to the MNOS 3 routine at step 163. If a TELEPHONE NUMBER ERASE/WRITE operation is detected, the program branches to the MNOS 6 routine at step 166 wherein data in RAM is transferred from location (6,8) to (0,3) which is MNOS Y data. In addition, RAM Y data is transferred from location (6,9) to location (0,2) in the scratch pad area. The MNOS Y data is then transferred to the accumulator 78 and the ADD AT 2 subroutine at step 167 is initiated for setting the MNOS X value by decrementing the previously set MNOS X value in the MNOS 1 subroutine.

The ADRY subroutine at step 168 sets the CHIP ENABLE signal provided to the MNOS memory 218 high and data is provided from the RAM 86 to the MNOS memory 218 in the DATA IN routine at step 169. This is followed by the resetting of the CHIP ENABLE pulse to 0 by the ADRX routine at step 170 where the CHIP ENABLE pulse is reset to 0. The GETX routine at step 171 is next executed wherein the AUTODIAL number is incremented by 9 and provided to the next address of the MNOS memory with 0 provided to the Y address of the MNOS.

The program next proceeds to the TELDAT routine 172 where the contents of RAM location (0,2) are loaded into the accumulator at the RAM Y address which initially is 0. The ADDATO routine 173 is next executed wherein the contents of the accumulator is provided to the Y register and the contents of RAM address (10,0) is provided to the accumulator. The ADRX subroutine at step 176 takes whatever is in the microcomputer's accumulator, outputs it to the microcomputer's data bus and toggles the CHIP ENABLE line to 0 for the loading of a control code number into the MNOS memory. In addition, the MNOS X value is incremented by 1 for providing the proper MNOS location for the second number read therein.

The program next proceeds to the TB 3 (Test Bit) instruction at step 177 and executes a loop for successively incrementing the X address location in the MNOS four times. Following the incrementing of the X address from G0 to G3, the program at step 178 increments the Y address of the MNOS for storing the fifth alphanumeric character of the stored telephone number. This is done following the transition of the CHIP ENABLE signal from a low to a high state in preparing the MNOS memory for receiving data from the microcomputer's accumulator 78. By means of the TB 3 instruction, the program determines when the last telephone number character has been stored in the appropriate MNOS memory loction. The program then resets RAM memory location (6,8) which indicates the end of an MNOS programming cycle followed by a check to determine if the program is within a valid range of MNOS Y memory values, i.e., 9-11 or 13-15. If the program is no longer operating in a valid MNOS Y value range, the routine is terminated at step 180. Similarly, if the program is still operating in a valid range of Y values for the MNOS memory, the contents of the accumulator are transmitted to RAM location (6,8) in providing the next MNOS Y value for telephone AUTODIAL number storage therein.

Figure 11:
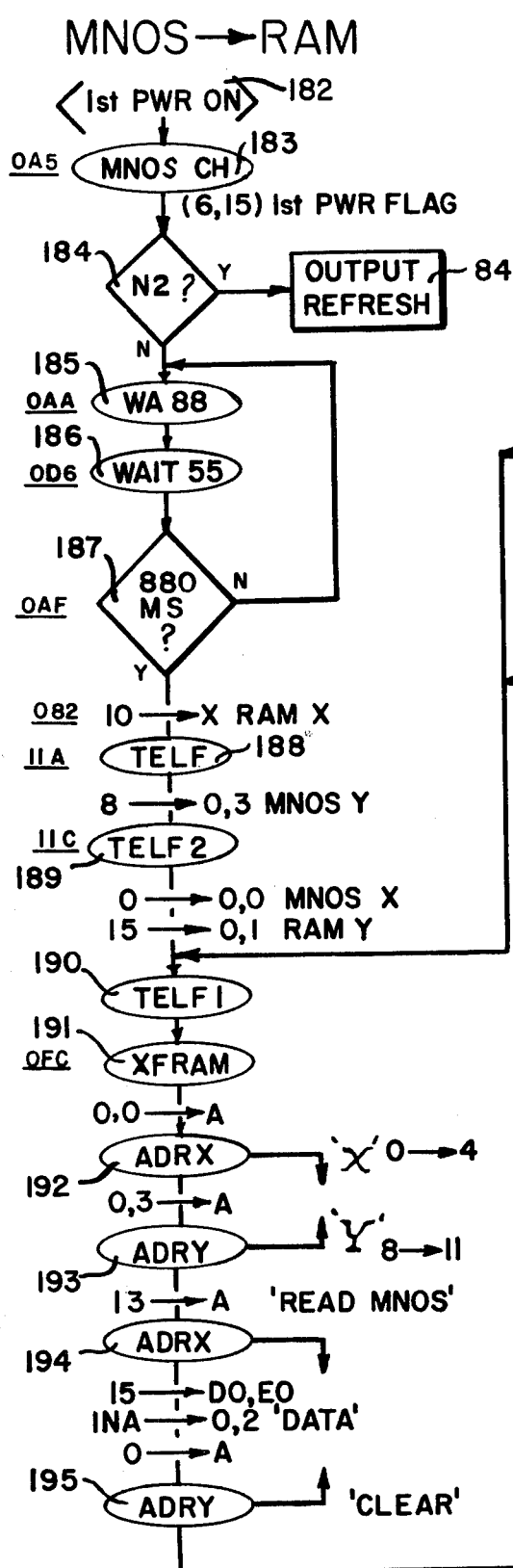
FIG. 11 is a flow chart showing the sequence of events under the control of the microcomputer wherein telephone number information stored in a nonvolatile memory is recalled therefrom and provided to the microcomputer for transmission to the telephone line.
Figure 11:
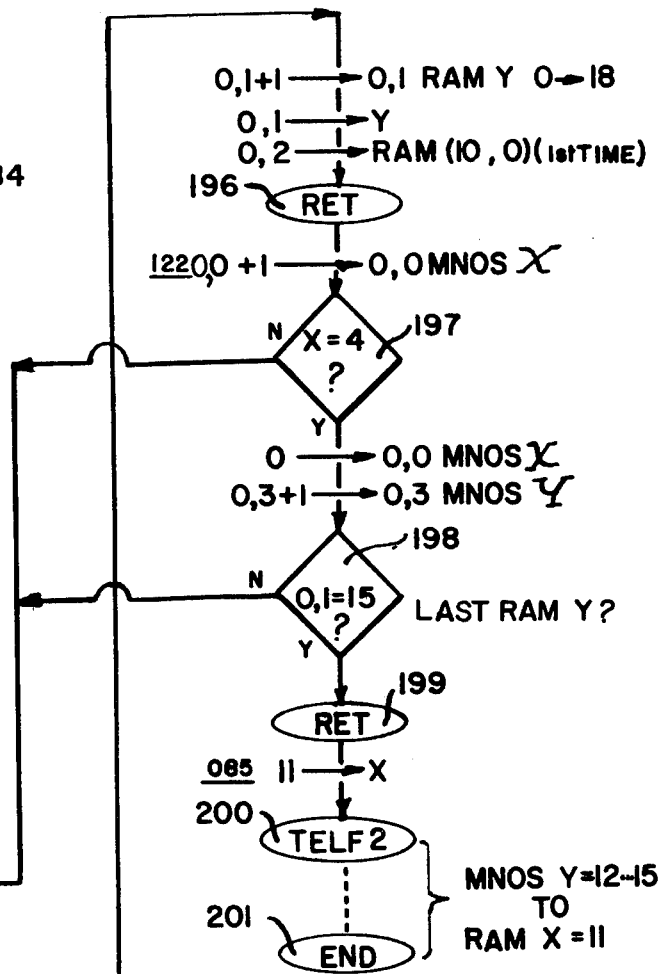

Referring to FIG. 11, there is shown the program steps in reading a stored telephone number from the MNOS memory 218 and writing it into RAM 86. Once power is applied to the television/telephone system of the present invention in step 182, the program executes an MNOSCH routine 183 in the MNOS READ/WRITE block 82 of FIG. 6 wherein a check is made to determine if it is the first time power has been applied to the television/telephone system. If power has previously been applied to the television/telephone system, the program branches at step 184 to the OUTPUT REFRESH block 84 of FIG. 6. If it is the first time that power has been applied to the television/telephone system, the program branches to the WA 88 subroutine at step 185 where an 880 millisecond interval is introduced into the program for the purpose of stabilizing the MNOS memory bias voltages following initial turn on. This is accomplished in steps 185, 186 and 187. Following this 880 millisecond period, the program loads 10 into the X register of the RAM and an 8 is loaded into RAM location (0,3) which represents the MNOS Y value in the TELF subroutine 188. Next, the TELF 2 subroutine at step 189 loads a 0 into the (0,0) scratch pad register of the RAM which represents the MNOS X value and 15 is loaded into the (0,1) RAM Y register.

The TELF 1 routine at step 190 initiates the reading of the contents of the aforementioned RAM locations into the aforementioned MNOS memory locations. The XFRAM subroutine at step 191 provides the contents of the RAM scratch pad register (0,0) to the accumulator 78. The ADRX routine at step 192 causes the CHIP ENABLE line to the MNOS memory to go low and provides the contents of RAM location (0,3), which represents the MNOS X value, to the accumulator. The ADRX subroutine at step 192 causes the CHIP ENABLE signal to transition to the low state with the X information thus provided to the MNOS memory 218. In addition, the contents of RAM location (0,3) are provided to the accumulator with the ADRY subroutine at step 193 causing the CHIP ENABLE signal to transition to the high state for loading this Y information into the MNOS. Next, 13 is loaded into the accumulator as an instruction that the contents thereof are to be read therefrom. In the ADRX subroutine at step 194, 1's are sent out to all the data buses to insure that they are in a high state, and the contents of the data bus are then loaded into the accumulator in addition to being placed in scratch pad memory location (0,2). This represents the first number being read from the MNOS and is denoted by the word DATA. A CLEAR operation is next performed by sending 0 to the accumulator and calling up the ADRY subroutine at step 195. The data then goes out and the control line toggles up. The (0,1) RAM Y value is then incremented by 1 which provides the next RAM Y value and this sequential loop continues with each RAM Y value taken in turn from the temporary storage location (0,2) in RAM.

The program next executes a RETURN at step 196 and increments the MNOS memory value by 1 for reading out the next sequential alphanumeric character of the stored telephone number. The sequential incrementing of the X value in the MNOS memory continues in the loop provided by step 197 until the contents of the X=4 location in the MNOS memory are read therefrom whereupon the MNOS Y value is incremented by 1 and the next four telephone digits are read from the MNOS memory and are provided to the RAM. Thus, step 197 provides for the sequential reading from the MNOS memory of the X values with a loop back to TELF 1 at step 190 provided until all four digits in an X location in the MNOS memory are read therefrom and provided to the RAM 86. A Y loop is provided by step 198 wherein the MNOS Y values are sequentially incremented and a loop back to the TELF 1 subroutine is executed until the complete telephone number stored in the MNOS memory has been read therefrom and provided to the RAM 86. Once a complete telephone number has been read from MNOS Y memory locations 8-11, the RAM X value is incremented with Y being loaded into the X register of the RAM. The program then jumps to TELF 2 at step 200 and executes the previously described X and Y loops with regard to the MNOS memory and the RAM. Thus, the first stored telephone number is sequentially read from the MNOS memory and provided to the RAM, which is followed by the sequential reading of the second telephone number stored in the MNOS and providing this number to the RAM 86 for storage therein and recall therefrom.

There has thus been provided a television/telephone system with an automatic dialing capability wherein select telephone numbers are stored in a memory and automatically recalled therefrom in response to a minimum number of user inputs. The remote control link of the television receiver is utilized for storing a plurality of predetermined telephone numbers in the memory and for automatically recalling a selected number therefrom in initiating a telephone call. The telephone numbers are stored and recalled from a non-volatile memory not subject to memory dropouts due to power interruptions by means of a microcomputer.

While particular embodiments of the present invention have be shown and described, it will be apparent to those skilled in the art that changes and modifications may be made therein without departing from the invention its broader aspects. The aim in the appended claims, therefore, is to cover all such changes and modifications as fall within the true spirit and scope of the invention.

TABLE IV

12:16 JAN 27 '82 G65ALIST.669AFTEM

```
                 509 *****************************************
                 510 *****************************************
                 511 **         PROGRAM START               **
                 512 *****************************************
                 513 *
0000 4FAF        514 INIT    CAL    OUTINT       OUTPUT INITIALIZE
                 515 *
0002 50          516         LI     0
0003 01          517 RAMCLR  TAX
0004 60          518         LY     0
0005 4C0F        519         CAL    CLRY
0007 81          520         AI     1            LAST ROW?
0008 E203        521         BNZ    RAMCLR       N
000A 33          522         LX     3
000B 69          523         LY     9
000C 82          524         SM     2            VOL MSD
                 525 *
                 526 *****************************************
                 527 **          BLOCK1                      **
                 528 *****************************************
                 529 *
000D 4C25        530 BLK1    CAL    WAITL
000F 4AB4        531         CAL    ACSCN        AC CLOCK SCAN
                 532 *
                 533 **
                 534 *
0011 37          535         LX     7            EVERY 20 MS BRANCH
0012 60          536         LY     0
0013 2E          537         ICM
0014 0D          538         L
0015 D1          539         TB     1
0016 E292        540         BNZ    FJOBD        << EVERY 20 MSEC >>
                 541 **
                 542 **                          << EVERY 20 MSEC >>
0018 4EA9        543         CAL    PFCHK
001A E390        544         BZ     AC1          << POWER OFF MODE >>
                 545 *                           << POWER ON MODE >>
001C 31          546 MNOS    LX     1            E/W FLAG CHECK
001D 6C          547         LY     12
001E 0D          548         L
001F E336        549         BZ     MNOS1        <NOT FOUND E/W FLAG>
                 550 *                           <FOUNDED E/W FLAG>
0021 6B          551         LY     11           ICM E/W COUNTER
0022 2E          552         ICM
0023 E290        553         BNZ    AC1          <NOW E/W CYCLE>
                 554 *                           <ERASE OP WRITE CYCLE ENDED>
0025 58          555         LI     8
0026 4AEF        556         CAL    RESTEW       E/W MODE RESET
                 557 *
                 558 *       ERASE/WRITE FLAG ; M(1,12)
                 559 *       DATA SET & ERASE    WRITE      NORMAL
                 560 *              9              8           0     M(1,15)
                 561 *
0028 6C          562         LY     12
0029 0D          563         L
002A C8          564         RM     8
002B 99          565         CI     9
002C E236        566         BNZ    MNOS1
```

TABLE IV cont.

```
             567 *
002E 4C00    568 MNWRT  CAL   EWCNT            E/W COUNTER SET & E/W FLAG TO WRITE
0030 B8      569        SM    8
             570 *
0031 5A      571        LI    10               SET WRITE MODE
0032 4D3A    572        CAL   ADRX
0034 406C    573        JMP   MNOS5
             574 *
             575 *
0036 58      576 MNOS1  LI    8
0037 4AEF    577        CAL   RESTEW           RESET E/W WHEN FLAG OFF
             578 *
0039 53      579        LI    3                X ADDRESS SET
003A 4D3A    580        CAL   ADRX
             581 *
003C 36      582        LX    6                CHECK WRITE FLAG
003D 60      583        LY    0
003E 0D      584 MNOS2  L
003F CF      585        RM    15
0040 E27B    586        BNZ   MNOS3            << FOUND E/W FLAG OF CH >>
0042 2C      587        ICY
0043 A8      588        CY    8
0044 E23E    589        BNZ   MNOS2            << NOT FOUND E/W FLAG OF CH >>
             590 *
             591 *****
0046 0E      592        LIC                    (6,3) TEL-MNOS FLAG
0047 90      593        CI    0                WRITE TO MNOS
0048 E36C    594        BZ    MNOS5            N
004A 27      595 MNOS6  STD   3                Y - MNOS Y
004B 0D      596        L                      (6,9)
004C 26      597        STD   2                RAM Y
004D 23      598        LD    3
004E 4935    599        CAL   ADDAT2           SET MNOS Y
0050 4874    600        CAL   GETX             RAM X
0052 4D0D    601        CAL   TELDAT           SET DATA
0054 22      602        LD    2
0055 03      603        TAY
0056 81      604        AI    1                NEXT RAM Y
0057 26      605        STD   2
0058 0D      606        L
0059 4AE2    607        CAL   ADRY             SET DATA
005B 23      608        LD    3
005C 81      609        AI    1                NEXT MNOS Y
005D D3      610        TB    3                9-11? OR 13-15?
005E 36      611        LX    6
005F 68      612        LY    8
0060 CF      613        RM    15
0061 E368    614        BZ    MNOS63           N
0063 0B      615        STIC                   MNOS Y
0064 22      616        LD    2
0065 0A      617        ST                     RAM Y
0066 408E    618        JMP   MNOS41
0068 6D      619 MNOS63 LY    13
0069 CF      620        RM    15               SPEED #
006A 408E    621        JMP   MNOS41
             622 *
             623 *
             624 *****
006C 4AE1    625 MNOS5  CAL   ADRYC            NO WRITE FLAG
006E 4A38    626        CAL   SW5060           50/60 HZ SW. SELECTION
0070 4CBE    627        CAL   BAND             BAND OUT REFRESH
0072 4158    628        JMP   BLK2
             629 *
             630 ****** LAST VOLUME SET
             631 *
0074 36      632 GETX   LX    6
0075 6D      633        LY    13
0076 0D      634        L                      SPEED #
0077 89      635        AI    9
0078 01      636        TAX                    TEL X
0079 60      637        LY    0
007A 1F      638        RET
             639 *
             640 ****** SKIP/SAVE DATA SET/
007B 02      641 MNOS3  TYA                    Y ADDRESS SET
```

TABLE IV cont.

```
007C 26        642        STD    2
007D 4935      643        CAL    ADDAT2
007F 34        644        LX     4
0080 4934      645        CAL    ADDAT1
0082 35        646        LX     5
0083 4934      647        CAL    ADDAT1
0085 34        648        LX     4
0086 4932      649        CAL    ADDAT
0088 88        650        AI     8
0089 03        651        TAY
008A 35        652        LX     5
008B 0D        653 MNOS4  L
008C 4AF2      654        CAL    ADRY
               655 *
               656 *
008E 4AEB      657 MNOS41 CAL    MNERAS       MNOS ERASE MODE SET & E/W FLAG SET(?
               658 *
0090 4158      659 AC1    JMP    BLK2
               660 *
               661 *
0092 3843D7    662 FJOBD  BJMP   FJOB
               663 *
               664 *
               665 **********
               666 **         UPPER RAM VIRGIN CHECK
               667 *
               668 *          M( 8,0-1 ) = 5,A
               669 *
0095 39        670 PONY   UPX                 POWER OFF TO ON
0096 31        671        LX     1
0097 6F        672        LY     15
0098 CF        673        RM     15           DISABLE REDIAL
0099 33        674        LX     3
009A 6D        675        LY     13
009B 0C        676        STDC
009C 36        677        LX     6
009D CF        678        RM     15           DOT POINTER CLEAR
009E 32        679        LX     2
009F 60        680        LY     0
00A0 CF        681        RM     15           RAM DP POINTER CLEAR
00A1 33        682        LX     3
00A2 6A        683        LY     10
00A3 C1        684        RM     1            UNMUTE FROM TEL MODE INTERRUPT
00A4 1E        685        RET
               686 *
00A5 36        687 MNOSCH LX     6            CPU 1 ST POWER ON TEST
00A6 6F        688        LY     15
00A7 0D        689        L
00A8 E2D0      690        BNZ    MNOSC5
               691 *
               692 *
               693 **********
               694 **         WAIT 880 MS     55MS X 16 = 880 MSEC
               695 *
               696 ******     LI 0
00AA 27        697 WA88   STD    3
00AB 4806      698        CAL    WAIT55       WAIT 55 MS SUBROUTINE
00AD 23        699        LD     3
00AE 81        700        AI     1
00AF E2AA      701        BNZ    WA88
               702 *
               703 *****      LAST VOLUME DATA TO CPU
               704 **********     TEL DATA TO RAM
00B1 39        705        UPX
00B2 32        706        LX     2            RAM X=10
00B3 421A      707        CAL    TELF
00B5 39        708        UPX
00B6 33        709        LX     3            RAM X=11
00B7 491C      710        CAL    TELF2
               711 *****      SKIP/SAVE DATA TO CPU
00B9 50        712        LI     0
00BA 48E3      713        CAL    READ4
00BC 48E6      714        CAL    READ5
               715 *****      LOWEST SAVED CH SET
00BE 4850      716        CAL    SWSCAN
```

TABLE IV cont.

```
 00C0 0D      717              L
 00C1 24      718              STD    0
              719  *
 00C2 67      720              LY     7
 00C3 B1      721              SM     1
 00C4 2E      722              ICM
 00C5 4C17    723  MM0         CAL    RDISP
              724  *
 00C7 4EC9    725              CAL    CH80
 00C9 E2CD    726              BNZ    MM
 00CB 43E1    727              JMP    PREUP
 00CD 36      728  MM          LX     6
 00CE 6E      729              LY     15
 00CF BF      730              SM     15
              731  MNOSC5 EQU  *
 00D0 4B50    732              CAL    SWSCAN           SW DATA SET
 00D2 0D      733              L
 00D3 24      734              STD    0
 00D4 45DD    735  MMZ         JMP    MC30
              736  *
              737  *
              738  **********
              739  **          WAIT 55MS             5 MS X 11 = 55 MSEC
 00D6 55      740  WAIT55      LI     5
 00D7 26      741  WA2         STD    2
 00D8 4AE6    742              CAL    WAITH
 00DA 4C25    743              CAL    WAITL
 00DC 4A83    744              CAL    CLKCNT
 00DE 22      745              LD     2
 00DF 81      746              AI     1
 00E0 E2D7    747              BNZ    WA2
 00E2 1F      748              RET
              749  *
              750  **********
              751  **          MNOS TO CPU
              752  *           CH SAVE          M(0,3) START FROM 0
              753  *           LAST VOL.        M(0,3) START FROM 8
 00E3 34      754  READ4       LX     4
 00E4 27      755              STD    3
 00E5 E1      756              SKIP
 00E6 35      757  READ5       LX     5
              758  *
 00E7 E0      759              TXA
 00E8 8C      760              AI     12
 00E9 24      761              STD    0
 00EA 5F      762              LI     15
 00EB 25      763              STD    1
 00EC 48F1    764              CAL    XFRAM0
              765  *
 00EE 20      766              LD     0
 00EF 82      767              AI     2
 00F0 24      768              STD    0
              769  **********
              770  *           MNOS DATA TO CPU
              771  **********
              772  *
 00F1 48FC    773  XFRAM0      CAL    XFRAM
 00F3 23      774              LD     3              MNOS Y
 00F4 81      775              AI     1
 00F5 27      776              STD    3
 00F6 D7      777              TB     7              ################################
 00F7 E2F1    778              BNZ    XFRAM0
 00F9 88      779  RMOD20      AI     8
 00FA 27      780              STD    3              MNOS Y
 00FB 1F      781              RET
              782  ********************
 00FC 20      783  XFRAM       LD     0              MNOS X
 00FD 4D3A    784              CAL    ADRX
 00FE 23      785              LD     3              MNOS Y
 0100 4AF2    786              CAL    ADRY
 0102 5D      787  RDMOD       LI     13             DATA OUT
 0103 4D3A    788              CAL    ADRX
 0105 5E      789              LI     15
 0106 12      790              OTD
 0107 FE      791              OTIE   15
```

TABLE IV cont.

```
0108 14        792          INA
0109 26        793          STD    2              DATA
010A 4AF1      794  RMOD10  CAL    ADRYC
010C 21        795          LD     1              RAM Y
010D 81        796          AI     1
010E 25        797          STD    1
010F 03        798          TAY
0110 22        799          LD     2
0111 0A        800          ST
0112 1F        801          RET
               802  *
0113 65        803  CHTEP1  LY     5
0114 30        804  CHTEP0  LX     0
0115 0F        805  CHTEP2  LDC
0116 27        806          STD    3              << CH 1'S >>
0117 0D        807          L
0118 26        808          STD    2              << CH10'S >>
0119 1F        809          RET
               810  *
               811  ************************
011A 58        812  TELF    LI     8
011B 27        813          STD    3              MNOS Y
011C 50        814  TELF2   LI     0
011D 24        815          STD    0              MNOS X
011E 5F        816          LI     15
011F 25        817          STD    1              RAM Y
0120 48FC      818  TELF1   CAL    XFRAM
0122 20        819          LD     0              MNOS X
0123 81        820          AI     1              NEXT
0124 24        821          STD    0
0125 94        822          CI     4              LAST X?
0126 E220      823          BNZ    TELF1          N
0128 50        824          LI     0
0129 24        825          STD    0              MNOS X
012A 23        826          LD     3
012B 81        827          AI     1
012C 27        828          STD    3              MNOS Y
012D 21        829          LD     1              RAM Y
012E 9F        830          CI     15             LAST Y?
012F E220      831          BNZ    TELF1          N
0131 1F        832          RET                   Y
               833  *
               834  *
               835  *
               836  **********
               837  **           MNOS DATA IN
               838  *
0132 88        839  ADDAT   AI     8
0133 03        840  ADDAT0  TAY
0134 0D        841  ADDAT1  L
0135 4AF2      842  ADDAT2  CAL    ADRY
               843  **********
               844  *            DATA IN MODE SET & Y-RE SET FROM 1(5,15)
               845  **********
0137 5C        846  DATAIN  LI     12
0138 4D3A      847          CAL    ADRX
013A 22        848          LD     2
013B 03        849          TAY
013C 1F        850          RET
               851  *
```

12:17 JAN 27 '82 G65ALIST.669AFTEM

```
               1339 **********
               1340 *       ERASE MODE SET OR RESET OF MCNS
               1341 **********
02EB 4C00      1342 MNERAS  CAL    EWCNT          E/W COUNTER SET
02ED B9        1343          SM    9              E/W FLAG SET
               1344 *
02EE 59        1345 ERMODE  LI     9              ERASE MODE SET
02EF 4D3A      1346 RESTEW  CAL    ADRX
02F1 50        1347 ADRYC   LI     0
02F2 12        1348 ADRY    OTD                   CAUTION PS FLAG !!!
02F3 C0        1349          RM    0
02F4 61        1350          LY    OMNOS
02F5 17        1351          SCO
02F6 1F        1352          RET
               1353 *
```

TABLE IV cont.

12:17 JAN 27 '82 G65ALIST.669AFTEM

```
 0500 22      1964 TELDAT  LD    2              RAM Y
 050E 4933    1965         CAL   ADDATO
 0510 81      1966         AI    1              NEXT RAM Y
 0511 26      1967         STD   2
 0512 81      1968         AI    1
 0513 D3      1969         TB    3              1,2 OR 3?
 0514 E20D    1970         BNZ   TELDAT         Y
 0516 1F      1971         RET
```

12:17 JAN 27 '82 G65ALIST.669AFTEM

```
              2008 **********
              2009 *            MNOS ADRES SET MEGA EDGE
              2010 **********
 053A 2B      2011 ADRX    SP
 053B 12      2012         OTD
 053C C0      2013         RM    0
 053D 61      2014         LY    OMNOS
 053E 16      2015 CT10    RC0
 053F 1F      2016         RET
```

12:25 JAN 27 '82 G65ALIST.669AFTEM

```
 0EFA CF      4628 FIX     RM    15             (6,9) MNOS Y
 0FFB 32      4629         LX    2
 0FFC 60      4630         LY    0
 0FFD CF      4631         RM    15             (2,0) DIGIT COUNT - FIX FOR RECALL
 0FFE 41E7    4632         JMP   BLK4
```

12:26 JAN 27 '82 G65ALIST.669AFTEM

```
              3138 *****************************************
              3139 **           TENKEY INPUT (ON-SET & REMOTE)   *
              3140 *                                             *
              3141 *       X=3    Y=6        TEN KEY FLAG        *
              3142 *       X=0    Y=5        DISPLAY CH LSD      *
              3143 *              Y=4        DISPLAY CH MSD      *
              3144 *              Y=2        KEY INPUT DATA      *
              3145 *              Y=0  BIT4  NOM/MODIFY SW FLAG  *
              3146 *****************************************
              3147 *
 09C5 0F      3148 TENKEY  LDC                  3,13 -> A
 09C6 93      3149         CI    INFODP         INFODP?
 09C7 E3D8    3150         BZ    TEST           Y
 09C9 0E      3151         LIC                  N
 09CA D2      3152         TB    2              TEL MODE?
 09CB E3E5    3153         BZ    TEST1          N
 09CD E9F6    3154         BP    TENEND         ONSET KEYS
 09CF 36      3155         LX    6
 09D0 0D      3156         L                    SPEED #?
 09D1 E2D8    3157         BNZ   TEST           TOGGLE ADIAL DISP
 09D3 33      3158         LX    3              N
 09D4 55      3159         LI    5
 09D5 0A      3160         ST                   SET TELDP
 09D6 471D    3161 TEN04   JMP   TELRAM
 09D8 36      3162 TEST    LX    6              Y=12
 09D9 22      3163         LD    2              SPEED #
 09DA E3F6    3164         BZ    TENEND         #=0
 09DC 93      3165         CI    3              3,4,---?
 09DD E5F6    3166         BC    TENEND         Y
 09DF 6D      3167         LY    13
 09E0 0A      3168         ST                   # -> (6,13)
 09E1 33      3169         LX    3
 09E2 55      3170         LI    5
 09E3 0A      3171         ST                   SET TEL DISP
 09E4 1F      3172         RET
 09E5 0D      3173 TEST1   L                    (3,13)
 09E6 95      3174         CI    5              TELDP?
 09E7 E3D6    3175         BZ    TEN04          Y
 09E9 51      3176 TEN03   LI    NOMDP
 09EA 0A      3177         ST
 09EB 66      3178 TEN05   LY    6              TEN KEY FLAG TEST
 09EC 09      3179         C
```

TABLE IV cont.

```
  09ED  0A       3180         ST               TEN KEY FLAG SET
                 3181 ***          CF=H   MORE THAN 2ND TEN KEY MODE
                 3182 ***          CF=L   1ST TEN KEY MODE
  09EE  30       3183 TEN10   LX    0             DISPLAY CH DATA SHIFT
  09EF  65       3184         LY    5
  09F0  0F       3185         LDC
  09F1  0B       3186         STIC
  09F2  22       3187         LD    2
  09F3  0C       3188         STDC
                 3189 *
  09F4  E496     3190         BNC   FT15
  09F6  1F       3191 TENEND  RET
                 3192 *
12:27 JAN 27 '82 G65ALIST.669AFTEM

0F1D  32       4437 TELRAM  LX    2             ******************
  0F1E  60       4438         LY    0
  0F1F  0D       4439         L                   NON-ZERO DIGIT POINTER?
  0F20  29       4440         RP
  0F21  E223     4441         BNZ   TEL30
  0F23  2B       4442         SP
  0F24  6E       4443         LY    14
  0F25  BF       4444         SM    15            1ST TIME FLAG TO I.D.
  0F26  6C       4445         LY    12
  0F27  BF       4446         SM    15            1ST TIME FLAG TO DIGIT POINTER
  0F28  384874   4447 TEL30   BCAL  GETX
  0F2B  E845     4448         BNP   TEL45
  0F2D  CE       4449 TEL35   RM    15            1ST DIGIT - INITIALIZE
  0F2E  BE       4450         SM    14            NON-DIGIT & 1227 BLANK CODE
  0F2F  2C       4451         ICY
  0F30  E22D     4452         BNZ   TEL35
                 4453 *       TYA
  0F32  50       4454         LI    0
  0F33  27       4455         STD   3             RAM DIGIT POINTER
  0F34  22       4456 TEL40   LD    2             LSD KEYBOARD DIGIT DATA
  0F35  0A       4457         ST                  LSD TO (7,0)
  0F36  23       4458         LD    3
  0F37  81       4459         AI    1
  0F38  9E       4460 TEL60   CI    14            MORE THAN 13 DIGITS?
  0F39  E242     4461         BNZ   TEL70         N
  0F3B  6D       4462         LY    13            Y - ERASE MSD
  0F3C  5E       4463         LI    14
  0F3D  0B       4464         STIC
  0F3E  32       4465         LX    2
  0F3F  6C       4466         LY    12
  0F40  2F       4467         DCM                 DEC DIAL OUT COUNTER
  0F41  1F       4468         RET
  0F42  32       4469 TEL70   LX    2
  0F43  0A       4470         ST                  RAM DIGIT POINTER
  0F44  1E       4471         RET
  0F45  4FAE     4472 TEL45   CAL   TELDIG        GET DIGIT COUNT
  0F47  27       4473         STD   3             SAVE DIGIT POINTER
  0F48  2D       4474         DCY                 YES
  0F49  2D       4475         DCY                 POINT TO MSD IN RAM
  0F4A  0E       4476 TEL50   LIC                 GET RAM DATA
  0F4B  0C       4477         STDC                SHIFTED LEFT
  0F4C  2D       4478         DCY                 POINT TO NEXT DIGIT
  0F4D  AF       4479         CY    15            PASSED Y=0?
  0F4E  E24A     4480         BNZ   TEL50         NO
  0F50  2C       4481         ICY                 POINT TO Y=0
  0F51  4734     4482         JMP   TEL40         STORE LAST ENTRY
                 4483 **
12:18 JAN 27 '82 G65ALIST.669AFTEM

1845 **********
                 1846 **             ENTER KEY
                 1847 **********
  048E  E8A3     1848 ENTST   BNP   ENTSTR
                 1849 **
                 1850 **             ON SET ENTER KEY
                 1851 **
                 1852 ***         LX    3
                 1853 ***         LY    13        DISPLAY MODE TEST
  0490  6C       1854         LY    12
```

TABLE IV cont.

```
 0491 0D      1855          L
 0492 D2      1856          TB     2            TEL MODE?
 0493 E2A1    1857          BNZ    ENT90        Y
              1858 *
 0495 4804    1859          CAL    EN10
 0497 E29D    1860          BNZ    ENT50
 0499 21      1861          LD     1
 049A 05      1862          OR
 049B 4944    1863          CAL    AAAA
 049D 4AF7    1864 ENT50    CAL    SKPCHK
 049F E2A5    1865          BNZ    ENT80
              1866 ENT70    EQU    *
 04A1 47F0    1867 ENT90    JMP    KDSP4
              1868 *
              1869 **********
              1870 **       REMOTE ENTER
              1871 **********
 04A3 4800    1872 ENTSTR   CAL    EN01
 04A5 45DB    1873 ENT80    JMP    MC25
              1874 **********

12:19 JAN 27 '82 G65ALIST.669AFTEM

1366 *
              1367 EN01     EQU    *            TEL KEY FLAG CHECK  X=3
 0300 66      1368          LY     6
 0301 0D      1369          L
 0302 E314    1370          BZ     EN20
 0304 4CCB    1371 EN10     CAL    CHCRT1
 0306 E546    1372          BC     EN30
 0308 4D42    1373          CAL    CHPRGE
 030A 4D01    1374 PRSTCH   CAL    STM01
 030C 23      1375 CHECKP   LD     3
 030D 84      1376          AI     4
 030E 01      1377          TAX
 030F 22      1378          LD     2
 0310 03      1379          TAY
 0311 21      1380          LD     1
 0312 04      1381          AND
 0313 1F      1382          RET
              1383 *
              1384 *
              1385 **********
 0314 36      1386 EN20     LX     6
 0315 6D      1387          LY     13
 0316 0D      1388          L
 0317 26      1389          STD    2            SPEED #?
 0318 E320    1390          BZ     EN24         N
 031A 28      1391          SP
 031B 384ED7  1392          BCAL   TELBIT       TEL MODE?
 031E E32D    1393          BZ     EN26         N
 0320 33      1394 EN24     LX     3
 0321 0D      1395          L
 0322 93      1396          CI     INFODP
 0323 E341    1397          BZ     EN27         Y
 0325 32      1398 EN21     LX     2
 0326 60      1399          LY     0
 0327 0D      1400          L                   TEL DIGITS?
 0328 384C07  1401          BCAL   TELTOG
 032B 44A1    1402 EN25     JMP    ENT90
 032D 0D      1403 EN26     L
 032E 95      1404          CI     5            TEL DISP?
 032F E220    1405          BNZ    EN24         N
 0331 CE      1406 EN22     RM     15           DISP CLEAR
 0332 66      1407          LY     6
 0333 CF      1408          RM     15           TENKEY CLEAR
 0334 36      1409          LX     6
 0335 68      1410          LY     8
 0336 22      1411          LD     2            SPEED #
 0337 91      1412          CI     1            #1?
 0338 E23C    1413          BNZ    EN23         N
 033A 58      1414          LI     8
 033B E1      1415          SKIP
 033C 5C      1416 EN23     LI     12
 033D 0B      1417          STIC                (6,8) MNUS Y
```

TABLE IV cont.

```
 033E 3847FA 1418         BJMP  FIX        RM15(6,9) MNOS Y & PM15(2,0) RECALL
 0341 384F6B 1419 EN27    BCAL  REDO       TOGGLE CH/TIME DISP
 0344 44A1   1420         JMP   ENT90
 0346 4C17   1421 EN30    CAL   RDISP
 0348 4328   1422         JMP   EN25
             1423  *
```

12:20 JAN 27 '82 G65ALIST.669AFTEM

```
 0ED7 33     4378 TELBIT  LX    3
 0ED8 6C     4379         LY    12
 0ED9 0E     4380         LIC
 0EDA D2     4381         TB    2              TEL MODE?
 0EDB 1F     4382         RET
```

12:21 JAN 27 '82 G65ALIST.669AFTEM

```
             3735  *
 0C07 33     3736 TELTOG  LX    3
 0C08 6D     3737         LY    13
 0C09 E212   3738         BNZ   TOG1           TEL MODE W/ DIGITS
 0C0B 4768   3739         JMP   REDIAL
 0C0D CF     3740 TOG0    RM    15
 0C0E E311   3741         BZ    TOGE           Y
 0C10 B1     3742         SM    1              N
 0C11 1F     3743 TOGE    RET
 0C12 0D     3744 TOG1    L
 0C13 95     3745         CI    PRDP           TEL DISP?
 0C14 CF     3746         RM    15
 0C15 E219   3747         BNZ   TOG2           N
 0C17 B1     3748         SM    1              Y
 0C18 1F     3749         RET
 0C19 91     3750 TOG2    CI    NOMDP          CH DISP?
 0C1A E21D   3751         BNZ   TOG3           N
 0C1C 1F     3752         RET
 0C1D B5     3753 TOG3    SM    5
 0C1E 1F     3754         RET
             3755  *
```

12:22 JAN 27 '82 G65ALIST.669AFTEM

```
 0F68 4ED7   4503 REDIAL  CAL   TELBIT         TEL MODE?
 0F6A 00     4504         NOP
 0F6B E38C   4505 REDO    BZ    REDEND         N
 0F6D E97B   4506         BP    RED1           SPEED # - SKIP 5 SEC AND INIT TEST
 0F6F 39     4507         UPX
 0F70 37     4508         LX    7
 0F71 62     4509         LY    2
 0F72 0D     4510         L                    5 SECONDS ELAPSED?
 0F73 E28C   4511         BNZ   REDEND         Y
 0F75 39     4512         UPX
 0F76 31     4513         LX    1
 0F77 6F     4514         LY    15
 0F78 0D     4515         L                    INIT?
 0F79 E38C   4516         BZ    REDEND         Y
 0F7B 22     4517 RED1    LD    2              SPEED #
 0F7C 89     4518         AI    9
 0F7D 01     4519         TAX                  TEL RAM X
 0F7E 4FAE   4520         CAL   TELDIG         GET DIGIT COUNT
 0F80 32     4521         LX    2
 0F81 60     4522         LY    0
 0F82 0A     4523         ST                   RAM DIGIT POINTER
 0F83 6C     4524         LY    12
 0F84 BF     4525         SM    15             DIAL DIGIT POINTER
 0F85 6E     4526         LY    14
 0F86 BF     4527         SM    15             I.D. INIT FLAG
 0F87 384FF6 4528         BCAL  TELINF         AUTODIAL OR DIRECT DIAL?
 0F8A 0A     4529         ST                   TEL DISP
 0F8B 1F     4530         RET
 0F8C 33     4531 REDEND  LX    3
 0F8D 6D     4532         LY    13
 0F8E 0D     4533         L
 0F8F 91     4534         CI    NOMDP          CH & TIME DISP?
 0F90 4400   4535         JMP   TOG0
```

TABLE IV cont.

```
12:22 JAN 27 '82  G65ALIST.669AFTEM

OFAE  60     4561  TELDIG  LY    0          GET DIGIT COUNT
   OFAF  0E     4562  TELD1   LIC
   OFB0  E389   4563          BZ    TELD2      NO 14 CODES
   OFB2  9E     4564          CI    14         DIGIT CODE?
   OFB3  E2AF   4565          BNZ   TELD1      Y
   OFB5  A1     4566          CY    1          (X,0)=14?
   OFB6  E289   4567          BNZ   TELD2      N
   OFB8  E1     4568          SKIP             Y - SKIP Y=1 TO ACC & 0 TO (C,3)
   OFB9  02     4569  TELD2   TYA
   OFBA  8F     4570          AI    15
   OFBB  27     4571          STD   3
   OFBC  1F     4572          RET

12:23 JAN 27 '82  G65ALIST.669AFTEM

07F6  22     2717  TELINE  LD    2          SPEED #?
   07F7  E3FB   2718          BZ    TELIN1     N
   07F9  50     2719          LI    0          Y - NO DISP
   07FA  E1     2720          SKIP
   07FB  55     2721  TELIN1  LI    5          TEL DISP
   07FC  33     2722          LX    3
   07FD  6D     2723          LY    13
   07FE  1F     2724          RET
                 2725 *
```

I claim:

1. In a television/telephone system for receiving a transmitted composite video signal having a video component and an audio component in a first mode of operation, said television receiver including a video display, audio signal processing circuitry including audio amplifier-speaker means and a tuner for selectively tuning said television receiver from a currently tuned channel to a desired channel, and for communicating by telephone in a second mode of operation wherein audio communication by means of a telephone line coupled to said television/telephone system may be initiated or responded to with incoming audio signals provided to said audio signal processing circuitry and audio amplifier-speaker means and outgoing audio signals provided to said telephone line by a microphone means responsive to acoustic signals provided thereto, an automatic telephone dialing system comprising:

remotely located mode selection means responsive to user inputs for generating a mode control signal representing said second mode of operation of said television/telephone system;

first remotely located control means responsive to said mode selection means and having a plurality of selectable keys for generating a first plurality of control signals representing channel numbers in said first mode of operation and a second plurality of control signals representing alphanumeric telephone number characters in said second mode of operation;

nonvolatile memory means having a plurality of accessible storage locations, each one capable of storing for later recall said channel numbers and said alphanumeric telephone number characters;

signal processing means responsive to said first and second plurality of control signals and coupled to said telephone line, said tuner and said nonvolatile memory means for generating and providing to said nonvolatile memory means for storage therein digitial tune words representing the channel number of a selected channel and digital dialing words representing a selected telephone number in said first and second modes of operation, respectively; and second remotely located control means for generating storage and recall commands and providing said commands to said signal processing means for respectively storing in and recalling from said nonvolatile memory means said digital tune words and said digital dialing words and providing said words respectively to said tuner and said telephone line.

2. The system of claim 1 wherein said signal processing means includes a microcomputer having a volatile memory for the temporary storage of said digital tune and dialing words therein prior to storage in and following recall from said nonvolatile memory means.

3. The system of claim 2 wherein said control signals provided to said microcomuter are binary in nature and said microcomputer includes:

counting means responsive to said control signals for counting the number of binary signals received from said first remotely located control means;

program memory means including a plurality of previously stored sequences of binary instructions for controlling said counting means;

central processing means coupled to said counting means and to said program memory means for recalling therefrom a predetermined sequence of stored binary signals for activating said counting means and for receiving from said counting means binary signals representing one of said first or second plurality of control signals corresponding respectively to channel numbers and alphanumeric telephone number characters;

clock pulse generating means coupled to said counting means and said central processing means for providing clock pulses thereto for controlling the transfer of said control signals from said counting means to said central processing means;

data memory means connected to said central processing means for temporarily storing said control signals received therefrom and for storing a plurality of binary signal codes representing said second mode of operation and alphanumeric telephone number characters, said data memory means providing said received control signals and said stored binary signal codes to said central processing means for comparison therein;

latch means coupled to said central processing means for receiving input signals in response to said comparisons and for providing output signals in response thereto; and switching circuit means coupling said signal processing means to said telephone line and responsive to said output signals for selectively coupling said television receiver audio signal processing circuitry, said audio amplifier-speaker means and said microphone means to said telephone line for initiating a telephone call.

4. The system of claim 1 further comprising switching means coupling said signal processing means to said telephone line, said switching means responsive to said digital dialing words recalled from said nonvolatile memory means for initiating a telephone call.

5. The system of claim 1 further including character generating means coupling said signal processing means and said video display, said character generator means responsive to said digital dialing words for displaying a telephone number recalled from said nonvolatile memory means on said video display.

6. The system of claim 1 wherein said nonvolatile memory means comprises an electrically alterable metal-nitride-oxide-semiconductor memory element.

7. The system of claim 1 wherein said first and second control signals and said mode control signal are pulse code modulated and transmitted in the infrared frequency spectrum.

8. The system of claim 1 wherein the audio signal processing circuitry and said audio amplifier-speaker means are disabled during the dialing of the recalled digital dialing words in preventing the transmission by said audio amplifier-speaker means of break-and-make mechanical dialing sounds.

9. The system of claim 1 wherein said digital dialing words are stored in said nonvolatile memory means in said first mode of operation of the television/telephone system.

10. The system of claim 1 further including third remotely located control means for generating a plurality of addressing commands each representing a predetermined storage location in said nonvolatile memory means for storing in or recalling from one of said predetermined storage locations digital dialing words representing a selected telephone number.

11. The system of claim 10 wherein said third remotely located control means includes a plurality of selectable keys each representing one of said accessible storage locations.

12. In a television receiver including a video display for presenting a received composite video signal thereon, audio amplifier-speaker means for generating an audio output in response to a received audio component of said composite video signal and a tuner including a microcomputer responsive to remotely generated tune signals for tuning said television receiver to a designated television channel and for presenting on said video display a selected channel number in a first mode of operation of said television receiver, said television receiver further including telephone interface means for coupling said television receiver to a telephone line in a second mode of operation wherein telephone communication may be initiated by placing an outgoing call or responded to by answering an incoming call, a method for automatically dialing a designated telephone number comprising:

remotely generating a function control signal;

providing said function control signal to said microcomputer for controlling said video display in presenting user-directed instructions thereon;

remotely generating binary signals representing the alphanumeric characters of said designated telephone number;

providing said binary signals to said microcomputer for processing therein;

transferring said binary signals from said microcomputer to a nonvolatile memory means for storage therein in accordance with said instructions;

remotely generating an operating mode control signal;

providing said operating mode control signal to said microcomputer for operating said television receiver in said second mode of operation;

reading said binary signals from said nonvolatile memory means; and providing said binary signals to said telephone line in automatically dialing said designated telephone number.

13. A method as in claim 12 further including presenting the alphanumeric characters of said designated telephone number on the video display of said television receiver during the storing in and recall from said nonvolatile memory means of said binary signals.

14. A method as in claim 12 wherein said nonvolatile memory means includes a plurality of storage locations for storing a plurality of binary signals representing the alphanumeric characters of a plurality of designated telephone numbers, said method further including designating the storage location in said nonvolatile memory into which the binary signals representing the alphanumeric characters of one of said plurality of designated telephone numbers is to be stored.

15. A method as in claim 14 further including designating the storage location in said nonvolatile memory from which the binary signals representing the alphanumeric characters of one of said plurality of designated telephone numbers is to be read.

16. A method as in claim 15 wherein said user-directed instructions presented on said video display relate to the storage location in said nonvolatile memory wherein said plurality of binary signals representing the alphanumeric characters of said designated telephone number are to be stored.

17. A method as in claim 12 further including muting said audio amplifier-speaker means when said binary signals are read from said nonvolatile memory means and provided to said telephone line for preventing the transmission by said audio amplifier-speaker means of break-and-make mechanical dialing sounds.

18. A method as in claim 12 wherein said remotely generated function control, binary and operating mode control signals are generated and provided to said microcomputer in the infrared frequency spectrum.

* * * * *